R. D. KING.
KEY CUTTING MACHINE.
APPLICATION FILED APR. 6, 1917.

1,410,683.

Patented Mar. 28, 1922.
13 SHEETS—SHEET 1.

Witness:
Geo. P. Davison

Inventor
Ray D. King
By Pond & Wilson
Attys.

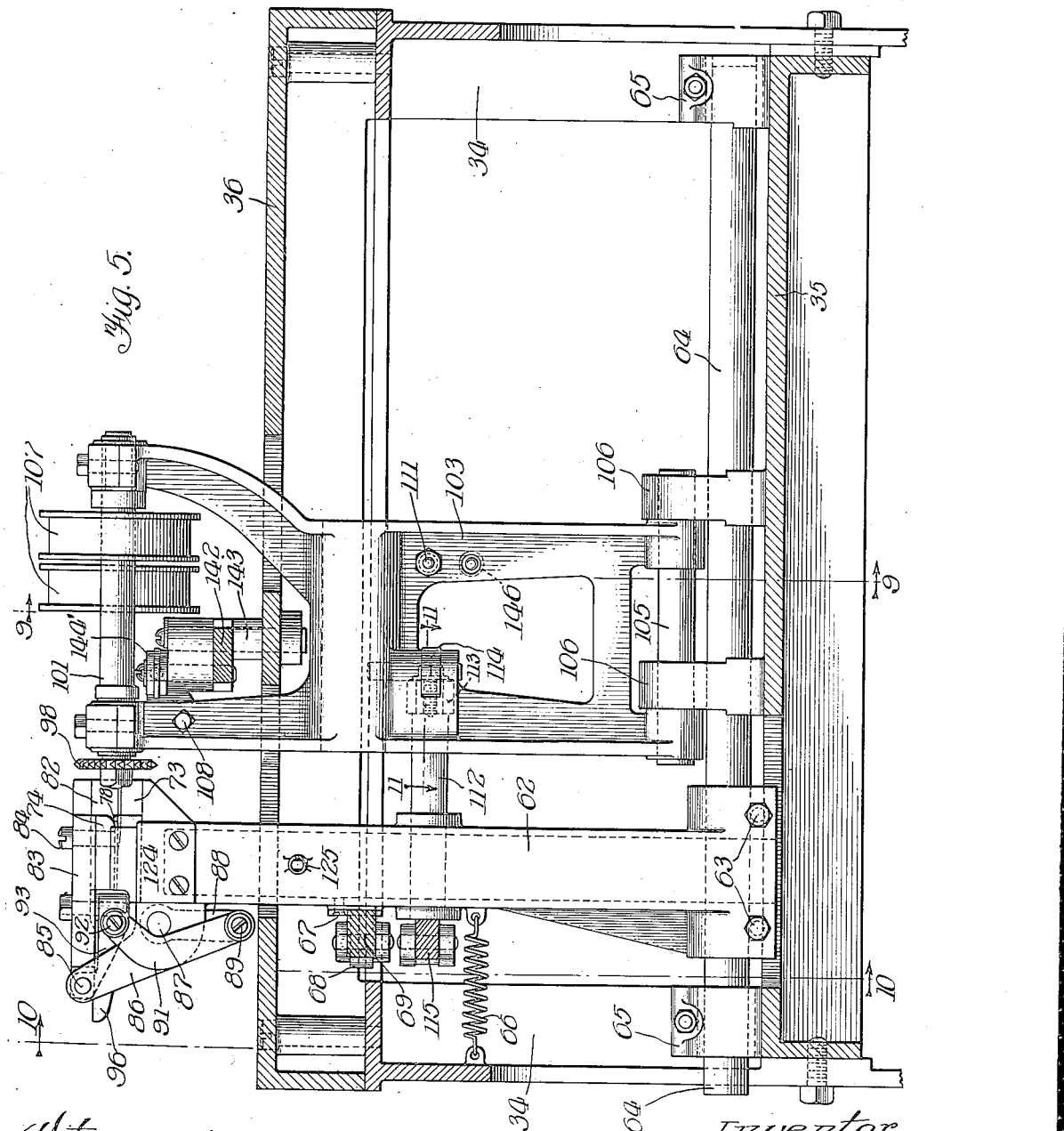

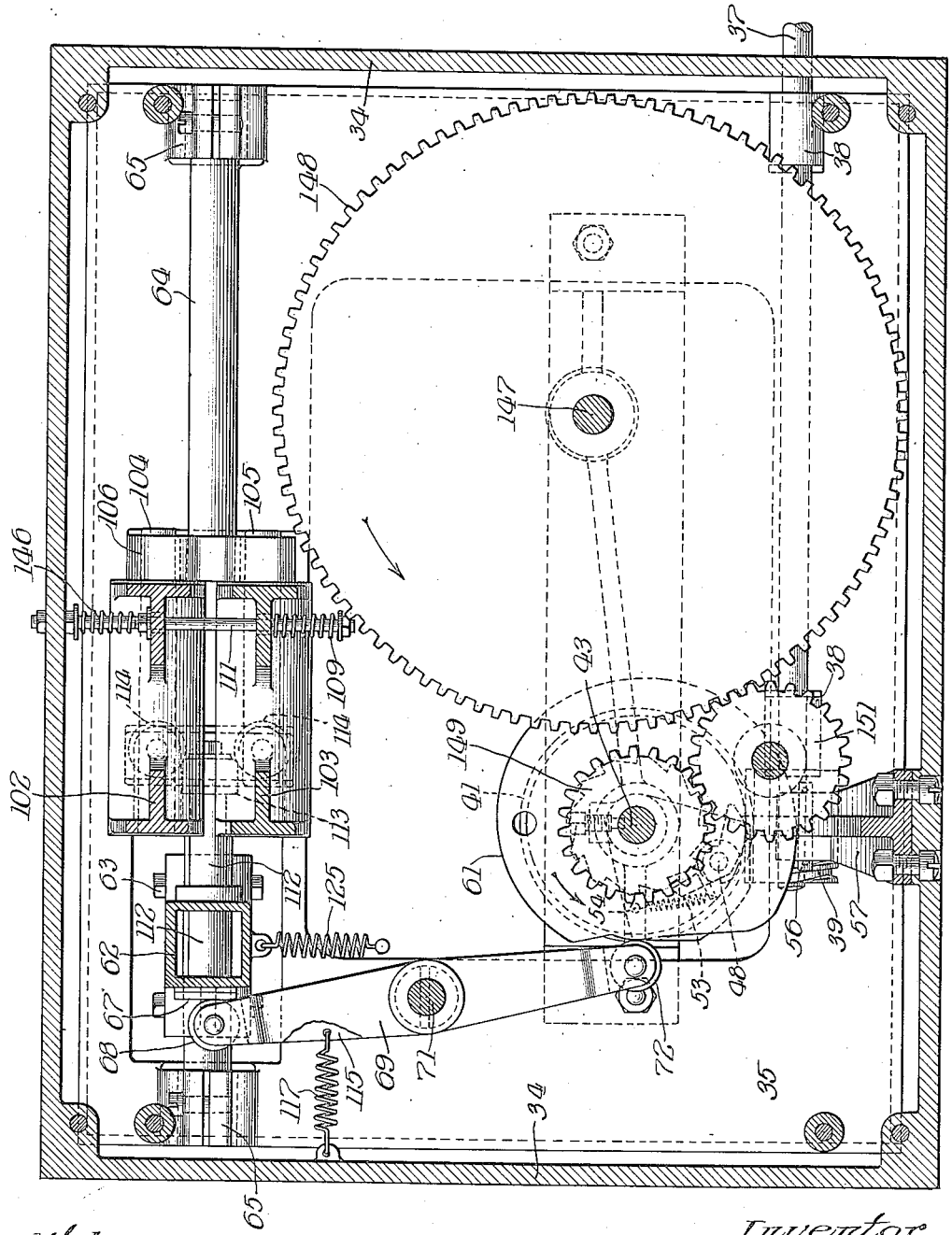

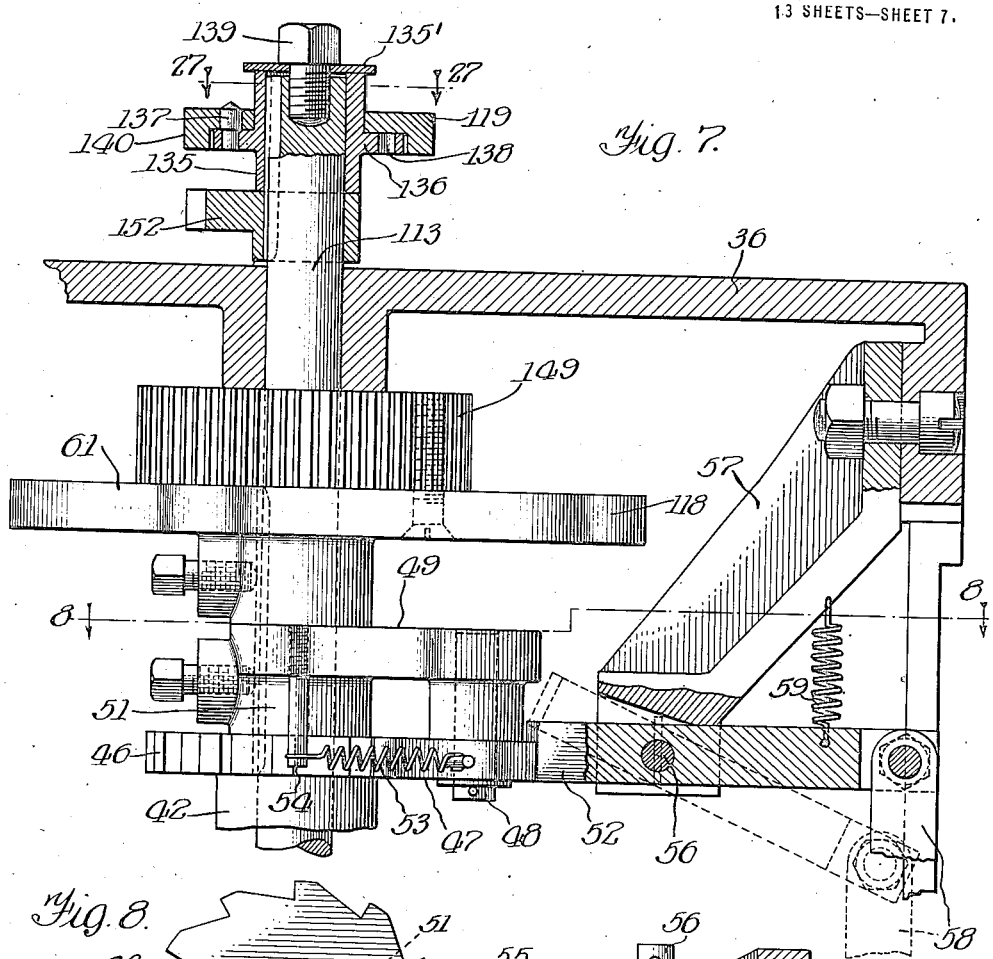

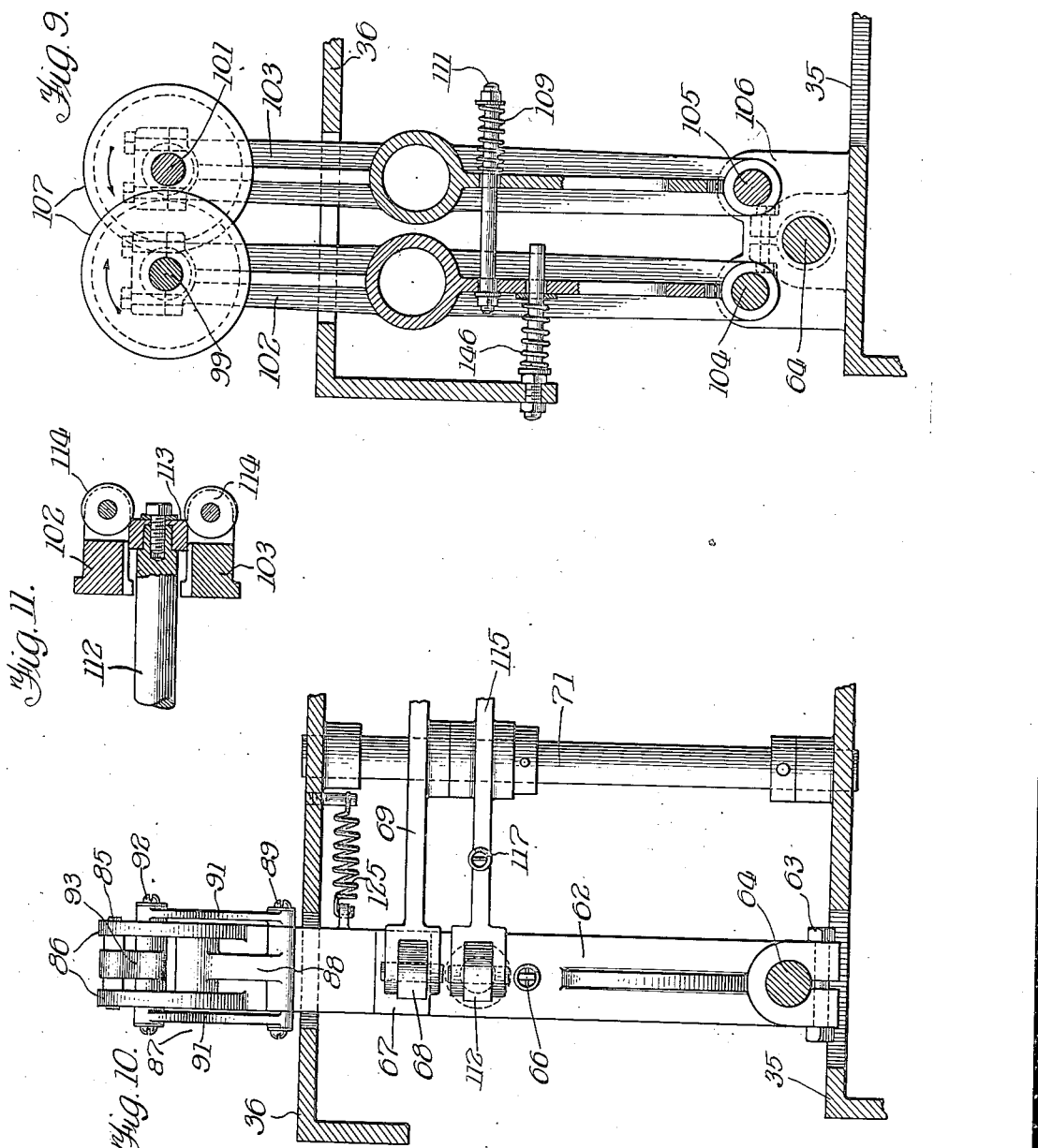

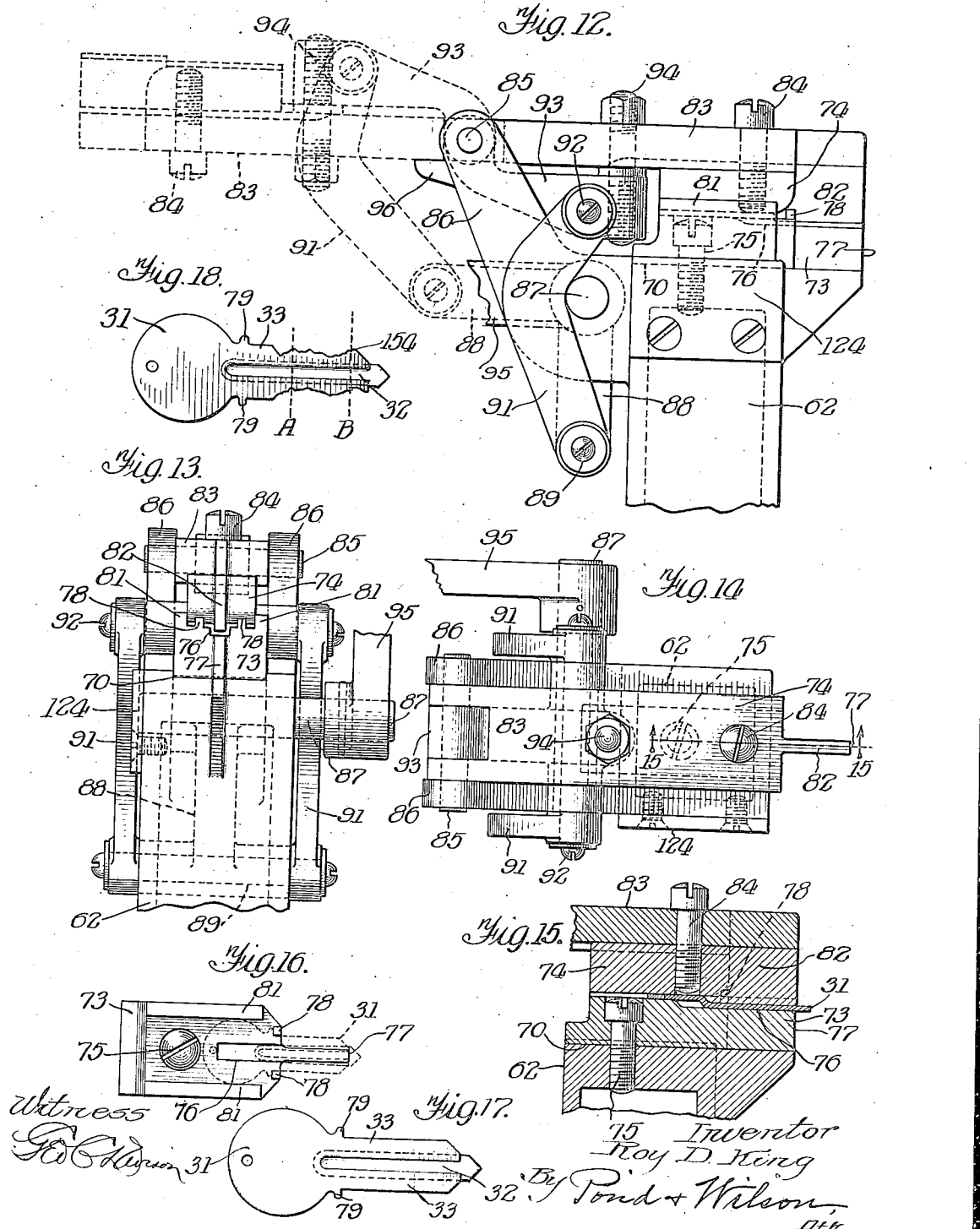

R. D. KING.
KEY CUTTING MACHINE.
APPLICATION FILED APR. 6, 1917.
1,410,683.
Patented Mar. 28, 1922.
13 SHEETS—SHEET 10.
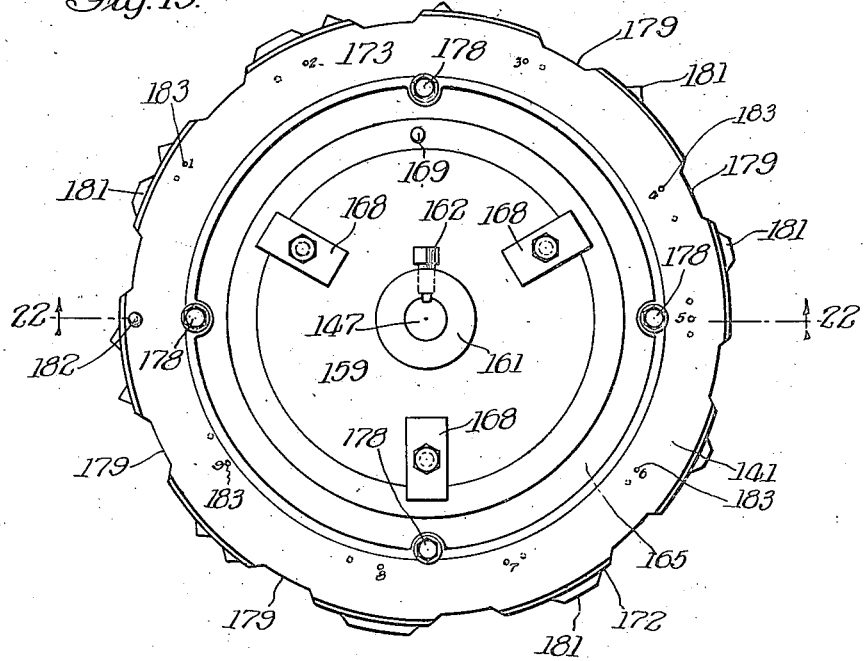
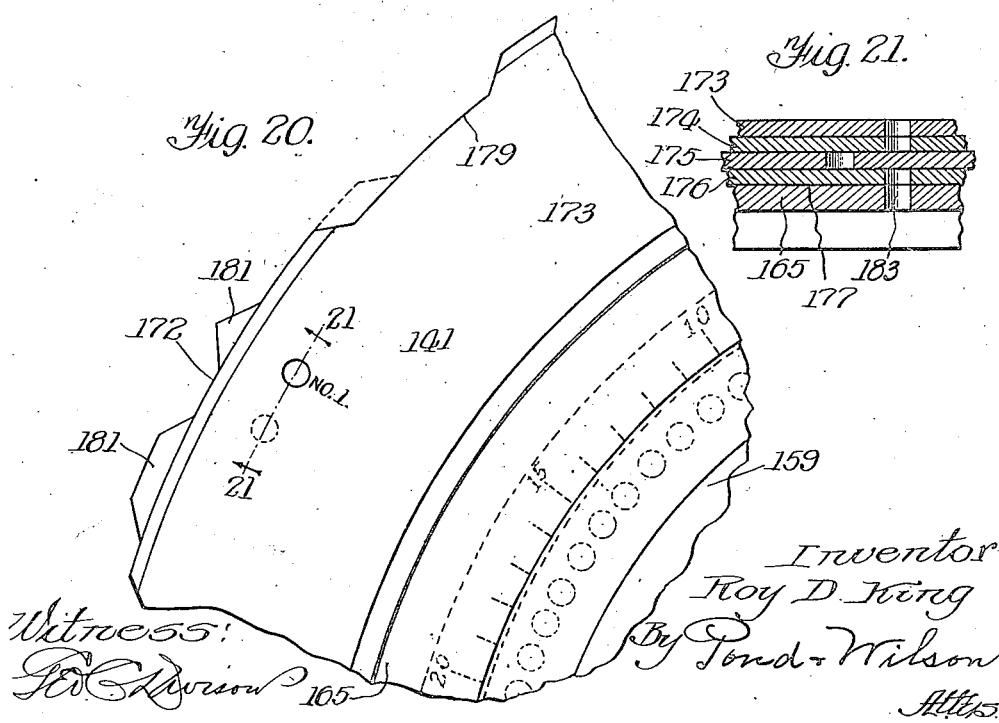
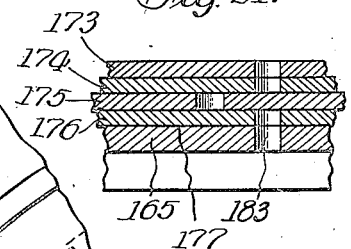
Inventor
Roy D. King
By Pond & Wilson
Attys
Witness:

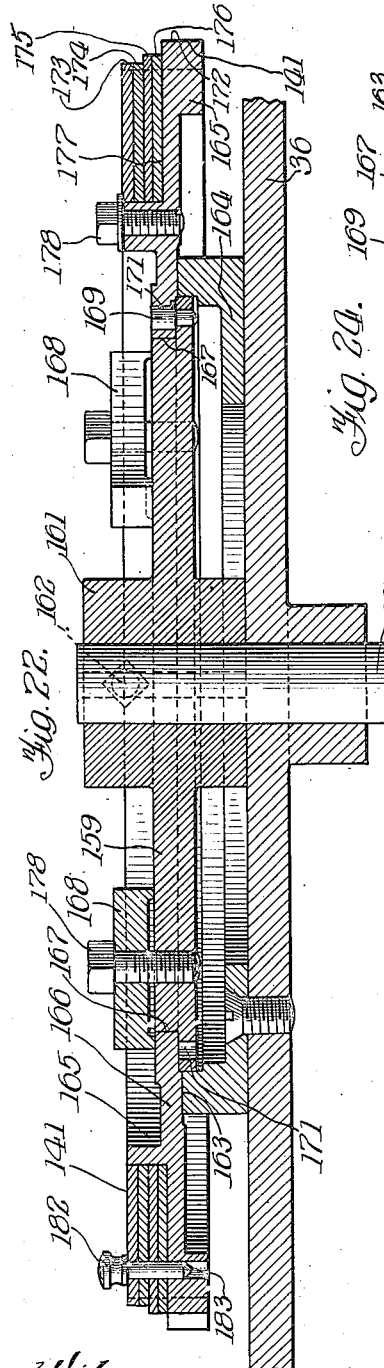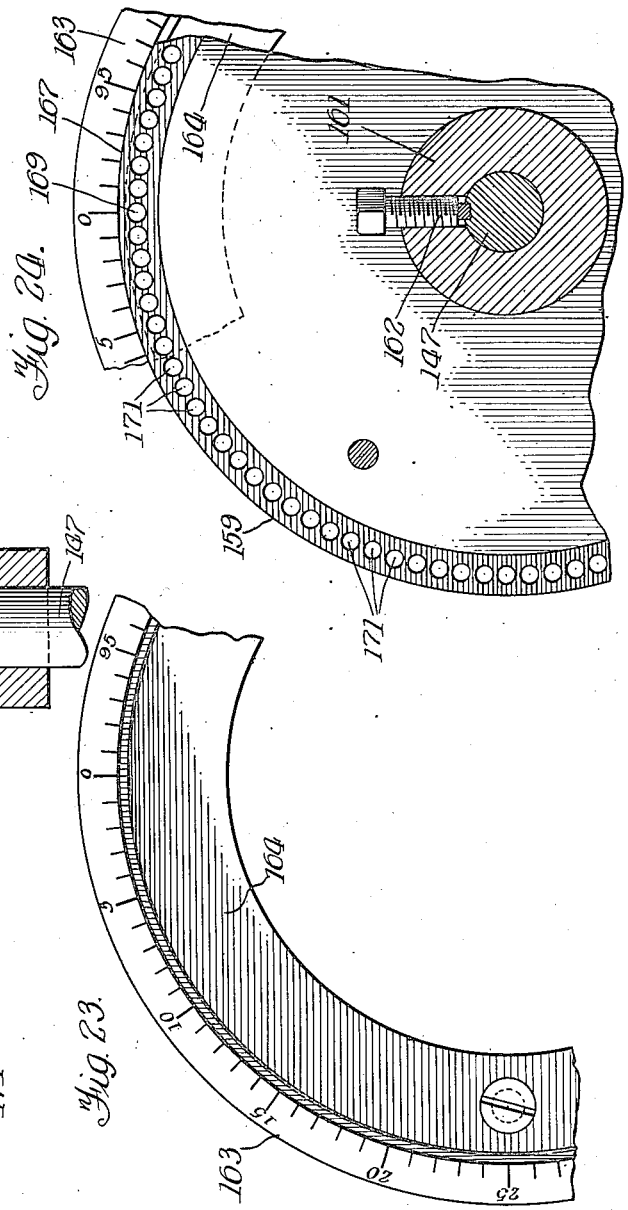

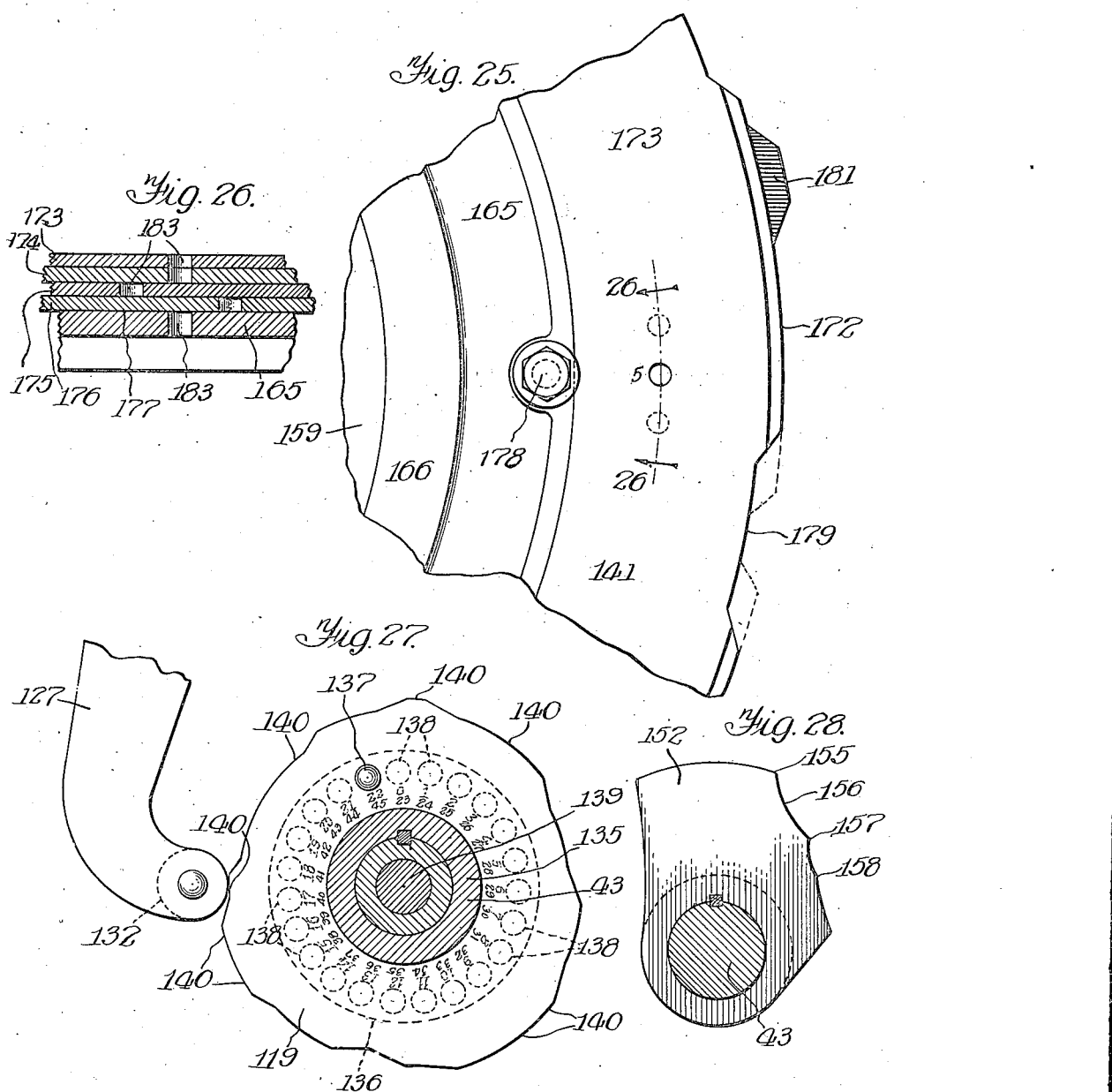

| KEY N° | PIN N° | KEY N° | PIN N° | KEY N° | PIN N° | KEY N° | PIN N° |
|---|---|---|---|---|---|---|---|
| 0 | 0 | 25 | 75 | 50 | 50 | 75 | 25 |
| 1 | 23 | 26 | 98 | 51 | 73 | 76 | 48 |
| 2 | 46 | 27 | 21 | 52 | 96 | 77 | 71 |
| 3 | 69 | 28 | 44 | 53 | 19 | 78 | 94 |
| 4 | 92 | 29 | 67 | 54 | 42 | 79 | 17 |
| 5 | 15 | 30 | 90 | 55 | 65 | 80 | 40 |
| 6 | 38 | 31 | 13 | 56 | 88 | 81 | 63 |
| 7 | 61 | 32 | 36 | 57 | 11 | 82 | 86 |
| 8 | 84 | 33 | 59 | 58 | 34 | 83 | 9 |
| 9 | 7 | 34 | 82 | 59 | 57 | 84 | 32 |
| 10 | 30 | 35 | 5 | 60 | 80 | 85 | 55 |
| 11 | 53 | 36 | 28 | 61 | 3 | 86 | 78 |
| 12 | 76 | 37 | 51 | 62 | 26 | 87 | 1 |
| 13 | 99 | 38 | 74 | 63 | 49 | 88 | 24 |
| 14 | 22 | 39 | 97 | 64 | 72 | 89 | 47 |
| 15 | 45 | 40 | 20 | 65 | 95 | 90 | 70 |
| 16 | 68 | 41 | 43 | 66 | 18 | 91 | 93 |
| 17 | 91 | 42 | 66 | 67 | 41 | 92 | 16 |
| 18 | 14 | 43 | 89 | 68 | 64 | 93 | 39 |
| 19 | 37 | 44 | 12 | 69 | 87 | 94 | 62 |
| 20 | 60 | 45 | 35 | 70 | 10 | 95 | 85 |
| 21 | 83 | 46 | 58 | 71 | 33 | 96 | 8 |
| 22 | 6 | 47 | 81 | 72 | 56 | 97 | 31 |
| 23 | 29 | 48 | 4 | 73 | 79 | 98 | 54 |
| 24 | 52 | 49 | 27 | 74 | 2 | 99 | 77 |

UNITED STATES PATENT OFFICE.

ROY D. KING, OF CHICAGO, ILLINOIS, ASSIGNOR TO COIN CONTROLLED LOCK COMPANY, OF CHICAGO, ILLINOIS, A CORPORATION OF CALIFORNIA.

KEY-CUTTING MACHINE.

1,410,683.

Specification of Letters Patent.   Patented Mar. 28, 1922.

Application filed April 6, 1917.  Serial No. 160,096.

*To all whom it may concern:*

Be it known that I, ROY D. KING, a citizen of the United States, residing at Chicago, in the county of Cook and State of Illinois, have invented certain new and useful Improvements in Key-Cutting Machines, of which the following is a specification.

This invention relates in general to key cutting machines, and more particularly to those for cutting keys especially adapted for use in coin controlled locks such as described in my co-pending application Serial No. 101,212, filed June 2, 1916. The invention, however, is in no way limited to the cutting of the keys for this particular class of locks, but embraces generally the manufacture of keys characterized by an irregular or undulate tumbler-engaging surface extending longitudinally of the key.

Machines employed at the present time to cut keys of this character are provided with patterns in the form of cam strips or master keys for determining the irregular shape of the key face and a memorandum record is kept of the pattern means utilized for producing each key, so that at any time a key may be duplicated by setting the pattern means in position on the machine either by reference to the memorandum or not, as may be required. The means and method employed to this end have, however, been ineffectual for practical and satisfactory purposes since it has been found in cutting large numbers of keys intended to be individually different, that because the irregular faces of the pattern means have been arbitrarily designed and have not been adjusted according to a precalculated method (although a record of such adjustments is kept), two or more keys are often cut with identical faces when it is thought each key is different from the other or others. Moreover, in cutting a large number of keys it is necessary to keep an accurate record of the various adjustments separate from the machine and to employ numerous variously designed cam strips and master keys, generally of the profile type, detachable from the machine and adapted to set in operative position thereon for cutting one or more keys according to the profile on the strip and to the adjustment thereof. This involves a more or less complicated system in which mistakes may be easily made. Moreover, when a key is to be duplicated its particular cam strip or master key must be located, mounted on the machine and properly set according to the memorandum or whatever record is kept. It will be readily apparent that where very large numbers of individually different keys are to be made this method inherently entails a large supply of cam strips, charts and records and necessitates considerable time in changing the cam strips, making the records and resetting the machine, and gives no assurance that two or more keys may not be duplicates even though made with different cam means which in their adjustments may cause similar keys to be produced.

The primary purpose of my invention, therefore, is to advance the art of key cutting machines by the provision of a machine for cutting keys in a manner to overcome the objectionable features mentioned and to enable a large number of keys to be accurately and precisely cut according to a well defined and mathematically calculated method whereby it is positively known that each key is different from all the others, and whereby the keys may be expeditiously cut and may be duplicated at any time independently of the key to be duplicated.

To the furtherance of this general purpose my invention contemplates various objects generally stated as follows: One object is to provide mechanism for cutting keys in a novel manner with the view to cutting a maximum number of differently irregular faces at a minimum cost and employing to this end devices of simple design requiring but little time and labor for operation. For this purpose a key-blank holder and key cutting means are relatively movable lengthwise of the key blank and during each movement both the key-blank holder and cutting means are independently moved transversely of said lengthwise movement to produce by their joint transverse movements the irregular or undulate key faces. Thus a greater multiplicity of different key faces may be cut since any transverse movement of the key-blank holder modifies the result that might be produced by the transverse movement of the cutting means if only the latter were moved transversely, or vice versa. A further object in this regard is to provide cam controlled mechanism for governing said transverse movements so that tumbler faces will be produced at predetermined points spaced longitudinally of the key by the joint result of said transverse movements, said faces being comparatively flat spots parallel with the longitudinal axis of the key and located at different distances from the medial line thereof as determined by the cam controlled mechanism.

Another object is to provide cam controlled mechanism for causing a given portion of the length of each key face, preferably the inner end thereof, to be identically cut irrespective of the irregularities of the remainder of the key face, this being advantageous for a purpose described in my copending application already mentioned.

An important feature of the invention resides in the means for and method of causing the various key-cutting movements. The cam controlled mechanism provided for this purpose is permanently associated with the machine and is mathematically designed so that there will be positively no two keys cut alike during any two or more of its different cam periods. The object is to separately cut in succession a series of keys, the mechanism being intermittently put into and out of operation for cutting each key, and upon being put into operation each time will automatically produce a key different from the preceding one without adjusting the mechanism in any way. When this series of keys has been cut, a simple adjustment is made whereby an entirely new series of individually different keys may be cut, and so on. Various simple adjustments are made between each series according to a defined method, until the maximum number of keys which the machine is designed to produce, has been cut. It may be said that a series of keys is cut in a unit of operation of the cam control mechanism and each unit of operation contains a large number of cam periods in each of which a single key is cut. By this method many thousands of individually different keys may be cut with mathematical precision and accuracy.

Another important feature is that the cam control mechanism itself contains simple indicia amounting to but comparatively few characters by reference to which the various adjustments are made according to the defined method mentioned, and hence, no chart or elaborate memoranda of the different adjustments is necessary. Instead, each key is numbered consecutively in the order in which it is cut. The number on any key is a key symbol of a combination under which the cam control mechanism may be easily and quickly set to operate through any cam period to duplicate a key. Consequently, there is a direct relation between the numbers on a key and the indicia on the cam control mechanism, the numbers on the keys being symbols designating the positions in which the several adjustable parts of the cam control mechanism must be set in order to duplicate a particular key. As a result, a large number of individually different keys of known design may be expeditiously cut according to a well defined plan and a record thereof kept by the cam control mechanism itself each key containing a number which is a symbol of the combination in which the cam control mechanism may be set to operate through the cam period for reproducing the particular key.

My invention contemplates still further the provision of a simple and improved machine for accomplishing the objects mentioned and containing various novel features relative to the construction and operation of the key-blank holder, the key cutting means and the cam control mechanism for effecting the desired movements, which together with other objects and attendant advantages will be more readily apparent as the invention becomes better understood by reference to the following description when considered in connection with the accompanying drawings, wherein—

Figure 4:
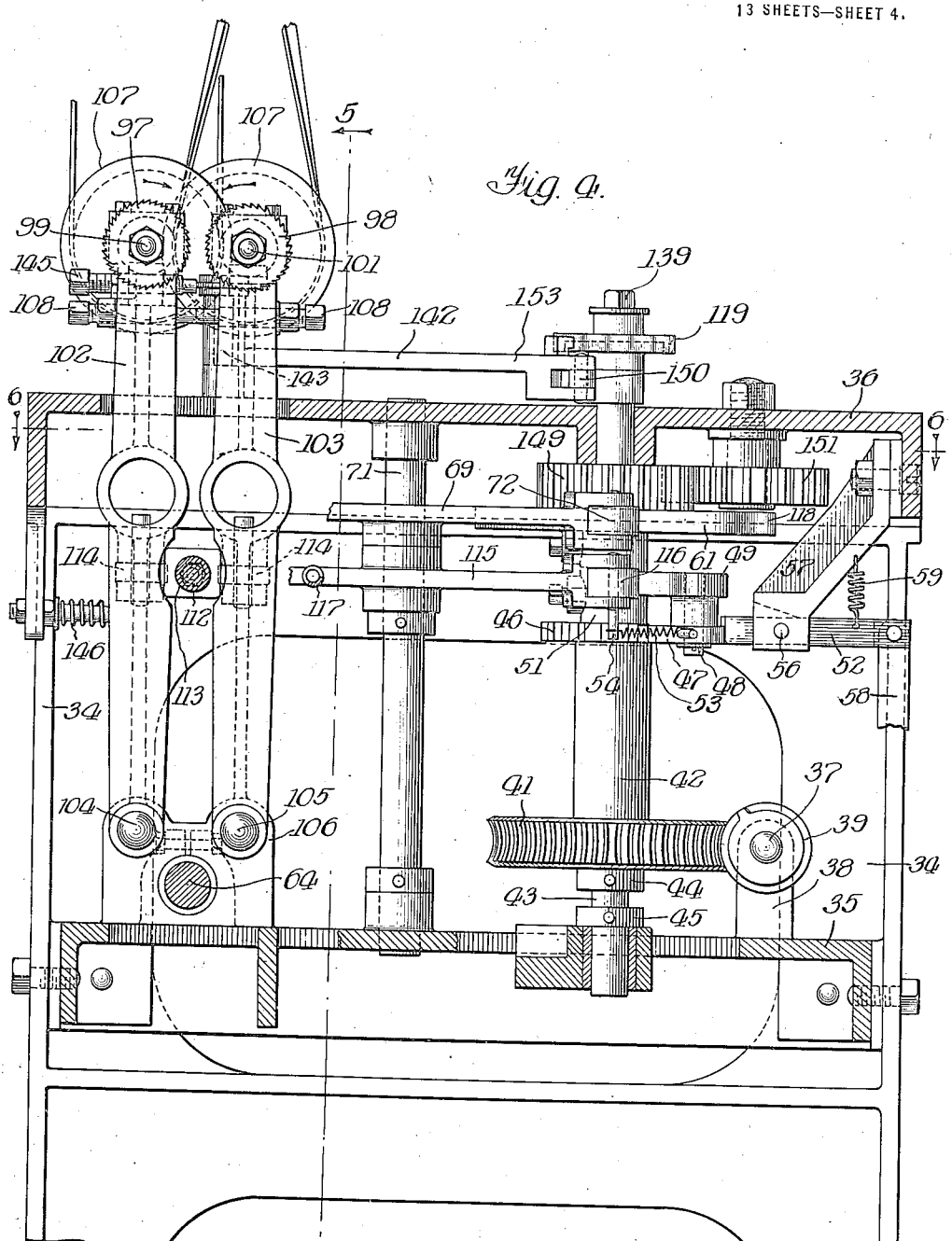
Fig. 4 is a vertical sectional view through the machine taken substantially on the line 4—4 of Fig. 3.
Figures 29, 30:
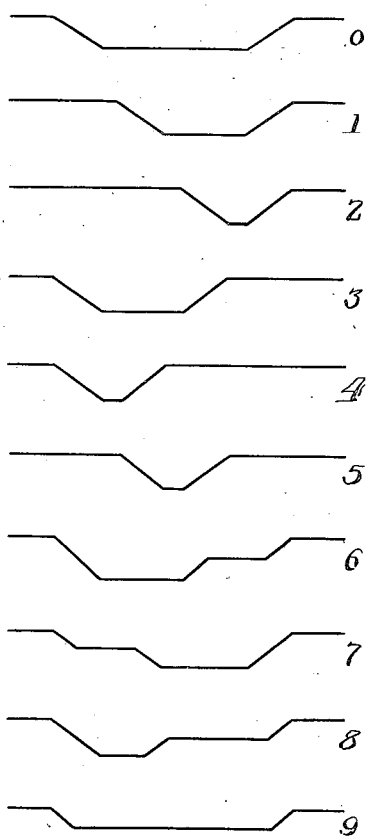

Figs. 5 and 6 are vertical and horizontal sectional views, taken substantially on the lines 5—5 and 6—6, respectively, of Fig. 4;

Fig. 7 is an enlarged fragmentary view partially in vertical section of the main cam shaft and adjacent parts;

Fig. 8 is a plan sectional view taken on the line 8—8 of Fig. 7;

Figs. 9 and 10 are vertical sectional views taken on the lines 9—9 and 10—10 of Fig. 5 showing the mounting of the cutter holders and key-blank holder, respectively;

Fig. 11 is a detail sectional view taken substantially on the line 11—11 of Fig. 5, showing the means for opening the cutters;

Fig. 12 is an enlarged side elevation of the key-blank holder in operative position and shown in dotted lines in inoperative position;

Fig. 13 is an enlarged view of the front end of the key-blank holder, that is, looking at the right side of Fig. 12;

Fig. 14 is a plan view of the key-blank holder shown in Fig. 12;

Fig. 15 is a vertical sectional view through the jaws of the key-blank holder taken on the line 15—15 of Fig. 14;

Fig. 16 is a detail plan view of the lower key blank jaw with a key blank in dotted lines resting thereon;

Figs. 17 and 18 are views, respectively, of a key blank before and after it has been cut by my improved key cutting machine;

Fig. 19 is a face view of the cam control device for governing the movement of the cutters;

Fig. 20 is an enlarged view of a peripheral portion of the cam device shown in Fig. 19 adjacent to the adjusting pin hole No. 1 thereof;

Fig. 21 is a vertical sectional view taken on the line 21—21 of Fig. 20;

Fig. 22 is an enlarged vertical sectional view through the cutter control cam device taken substantially on the line 22—22 of Fig. 19;

Fig. 23 is a detail face view of a portion of the stationary tabulated ring with which the cutter control cam co-operates;

Fig. 24 is a plan sectional view in the horizontal plane of the top face of the base part shown in Fig. 23, showing the manner in which the cutter control cam co-operates therewith;

Fig. 25 is an enlarged view of a peripheral portion of the cutter control cam device adjacent to the adjusting-pin hole No. 5;

Fig. 26 is a detail sectional view taken on the line 26—26 of Fig. 25;

Fig. 27 is an enlarged plan sectional view taken substantially on the line 27—27 of Fig. 7, illustrating the key blank control cam;

Fig. 28 is a similar plan sectional view of the cam located just below the key blank control cam;

Fig. 29 is a diagrammatic view of the several adjustments of the cam rings of the cutter cam control means; and Fig. 30 is a chart containing memoranda for reference purposes when setting the machine to duplicate keys.

Since the machine has been designed especially to cut a particular kind of key, an understanding of the invention will be facilitated by referring first to this particular type of key and the manner in which the tumbler surfaces are formed thereon. Figs. 17 and 18, respectively show a key blank before and after it has been cut. This key is particularly adapted for use in a tumbler lock of the character described in my co-pending application mentioned above, and contains opposed irregular faces extending longitudinally of the key blank. In this particular instance, the key 31 is shaped to provide a longitudinal channel 32 and opposed longitudinal edge portions 33 as shown, in which portion the tumbler surfaces are cut. By reference to Fig. 18 showing a cut key, it will be noted that the corresponding tumbler surfaces on opposite edges are in duplicate and equi-distant apart so that the profiles of the surfaces are similar. It may also be said that there is a plurality of tumbler surfaces spaced apart longitudinally and located at different distances from the medial line of the key, the opposed tumbler surfaces being equi-distant apart. In the key shown there are ten tumbler surfaces between the dotted lines A—B so that the key is adapted for a lock of the type described in my said application having ten tumbler plates. It should be understood, however, that this particular type of key is shown simply for purposes of illustration and that the invention comprehends the cutting of various forms of keys characterized by a longitudinal irregular or undulate key face.

The serrated faces are cut by moving the key blank lengthwise between a pair of opposed rotary cutters held in fixed relative relation and by causing the blank and cutters to be relatively moved transversely of said lengthwise movement whereby to produce the irregular effect shown wherein the tumbler surfaces are at different distances from the medial line of the key. It will be obvious that such effect may be produced separately by moving either the cutters or the key blank transversely relatively to the other, but a feature of my invention resides in simultaneously moving both the cutters and key blank transversely in distinct and different movements controlled from independent sources. The irregular faces are, therefor, the result of the joint action of said independent transverse movements of the cutters and key blank, thereby giving important advantages apparent hereinafter. The principal devices employed for producing this effect are a key-blank holder which carries the blank lengthwise in a feed movement and sidewise in the transverse movement mentioned, a key cutting means consisting of a pair of spaced cutters mounted so as to be capable of certain desired movements and especially the said transverse movement, and a cam control mechanism for governing the feed movement of the key-blank holder and the transverse movements of the said key-blank holder and cutting means, all of which will be fully described.

The main frame of the machine may be of suitable construction, and as shown consists of upright leg sections 34 joined together by a base 35 and a top platform 36, forming a frame of generally rectangular shape. A main drive shaft 37 journaled in bearings 38 mounted on the base 35 may be constantly driven by suitable means and is equipped with a fixed worm 39 meshing with a worm gear 41 fixed to a sleeve 42 in turn loosely mounted on a cam shaft 43 and confined against lengthwise movement thereon by a collar 44 and parts mounted on the shaft above the sleeve. The shaft 43 journaled in suitable bearings in the base and top of the frame, as shown in Fig. 4, is held in position by a collar 45 and is adapted to be driven in single revolution movements by the sleeve 42 through the agency of a ratchet and pawl clutch put into operation at will by an operator. This clutch, best shown in Figs. 7 and 8, consists of a ratchet wheel 46 fixed to the upper end of the sleeve 42, a pawl 47 pivotally mounted on a pin 48 carried by a cam designated generally by reference character 49 formed integral with a collar 51 fixed to the shaft 43 by means of a key and set screw, as shown, and a pivoted releasing bar 52. A contractile spring 53 connecting the pawl 47 to a pin 54 fixed to the cam 49 constantly urges the pawl in a direction to engage in the ratchet wheel 46 so as to establish driving connection between the sleeve 42 and shaft 43. The pawl is, however, normally held out of engagement with the ratchet wheel by the release bar 52, which as shown in Fig. 8 engages the inclined end 55 of the pawl for this purpose. The bar 52 is pivotally supported intermediate its ends at 56 on the lower end of a bracket arm 57 bolted to the top 36 and may be swung on its pivot to the dotted line position indicated in Fig. 7, thereby releasing the pawl so that it will be moved into engagement with the ratchet wheel under the influence of the spring 53. Any suitable means may be provided for operating the release bar 52, such for instance, as a link 58 connected to the bar and adapted to be operated by means of a foot or hand lever (not shown) or otherwise, at the will of an operator, a contractile spring 59 being employed to return the bar to horizontal position. The pawl having been engaged in the ratchet wheel will be carried thereby in a counter-clockwise direction viewing Fig. 8, thus revolving the shaft 43 in said direction until the inclined end 55 of the pawl engages the adjacent end of the bar 52 lying in its path and is moved by said bar out of engagement with the ratchet wheel, thereby stopping rotation of the shaft 43. The operator may thus cause, at will, the shaft 43 to be revolved but a single revolution, and during each revolution of this shaft the mechanism controlled thereby and which will presently be described is operated to cut a single key.

The cam 49 on the shaft 43 operates what may be termed a cutter opener described hereinafter, and a cam designated generally by reference character 61 suitably fixed to the shaft 43 immediately above the cam 49 causes the lengthwise feed movement of the key-blank holder, which feature of the invention will now be described. Referring particularly to Figs. 4, 5, 6 and 10, an upright carriage 62 clamped by means of bolts 63 to a shaft 64 supported in bearings 65 so as to be movable lengthwise and rotatable therein projects through an opening in the top 36 and carries thereabove the key-blank holder. By sliding the shaft 64 lengthwise, the carriage will be moved to cause the lengthwise feed movement of the key blank mentioned above and by rocking the carriage 62 on the bearings of the shaft 64, the transverse movement of the key blank will be effected. A contractile spring 66 (Fig. 5) connecting the carriage 62 to an adjacent part of the frame normally holds the carriage in the position shown against lengthwise feed movement and at the same time maintains the surface 67 of the carriage in engagement with a roller 68 carried at one end of a rocker arm 69 pivotally mounted intermediate its ends on a fixed shaft 71. The opposite end of the lever 69 is equipped with a roller 72 engaging the periphery of the cam 61. This cam, best shown in Fig. 6, is shaped so that when revolved in a counter-clockwise direction by the shaft 43, it will rock the lever 69, causing the carriage 62 to be moved on its bearings in a slow but constant feed movement against the tension of the spring 66. This feed movement it will be noted occupies approximately 270 degrees of the cam, after which the sudden fall in the cam permits the spring 66 to retract the carriage. In other words, during approximately three-quarters of the revolution of the shaft 43 the key blank will be advanced in a constant speed motion and during the final quarter of the revolution will be retracted.

The key-blank holder per se mounted on the upper end of the carriage 62 will now be described, referring particularly to Figs. 12 to 15 inclusive. It consists, generally stated, of a stationary jaw element 73 fixed to the carriage 62 and a movable jaw element 74 adapted to be manually operated in a novel manner to clamp and lock a key blank in connection with the stationary jaw. The stationary jaw, best shown in Figs. 13, 15 and 16, is in the form of a rectangular block of less width than the top of the carriage 62, seated in a groove 70 in the carriage top and fixedly secured therein by a bolt 75. The upper face of the jaw 73 contains a centrally disposed groove 76 for the reception of the depressed rib of the channel 32 of a key blank, and a narrow extension 77 of the jaw 73 in alignment with said groove 76 further supports said rib in a manner to allow the opposed edges 33 of the key blank to be exposed. The fixed jaw is also formed with a pair of upstanding lugs 78 serving as stops against which the ears 79 of the key blank are adapted to abut for limiting outward movement of the key blank and with raised parallel sides 81 for confining the hand piece of the key against sidewise movement. The movable jaw 74 fits within the raised sides 81, as shown in Fig. 13, and is provided with a depending and outwardly projecting rib 82 adapted to fit snugly in the depression of the key channel 32 so that when the movable jaw is in operative engagement with the key blank, as shown in Fig. 15, the latter is rigidly and substantially clamped and held against movement in any direction. An arm 83 to which the movable jaw is fixedly secured by means of a bolt 84 is pivotally mounted at its bifurcated end on a pin 85 carried by a pair of upstanding arms 86 integral with the carriage 62. A rock shaft 87 journaled in the inner ends of the arms 86 has fixedly secured thereto intermediate said arms a depending arm 88 carrying at its free end a pivot pin 89 upon which is pivotally mounted at the outer sides of said arms 86 a pair of links 91 pivotally connected at their opposite ends at 92 to a hinge member 93 pivotally mounted on the pin 85 in the fork of the arm 83 and adjustably secured at its other end to said arm 83 by means of a bolt 94. In the position in which the parts are shown in full lines in Fig. 12 the movable jaw is locked against rising movement by reason of the fact that the axes of the shaft 87 and the pins 89 and 92 are in alignment. In order to swing the jaw upwardly on its pivot 85 the shaft 87 is oscillated in a clockwise direction, and for this purpose a suitable hand lever 95 fixed to one end of the shaft 87 is provided. By turning the crank in a clockwise direction viewing Fig. 12, the links 91 will be carried upwardly moving the pivot 92 through an arc of which the pivot pin 85 is the center, thereby breaking the locking effect of the levers and swinging the movable jaw to an inoperative position somewhat beyond the vertical but not to the position indicated in dotted lines. During this movement it will be noted that the pivot 92 will reach a point in alignment with the pivots 85 and 89 and the momentum of the movable jaw is relied upon to carry said pivot 92 beyond said alignment and being carried beyond said alignment it is necessary to reverse the movement of the hand crank in order to carry the movable jaw to the dotted line position. In other words, in swinging the movable jaw to the inoperative position shown in dotted lines the hand crank is swung in a clockwise direction in a quick movement, causing the movable jaw to be swung upwardly and carried by momentum past said alignment and upon passing said alignment the crank comes to a momentary pause and must then be immediately swung in a counter-clockwise direction in order to bring the movable jaw to the inoperative position indicated. A stop 96 integral with the arms 86 limits movement of the arm 83 in a counter-clockwise direction and determines the inoperative position shown. In swinging the movable jaw back to operative position after a key blank has been placed on or removed from the movable jaw, the crank 95 is first moved quickly in a clockwise direction until the pivot 92 passes alignment with the axes 85 and 89, whereupon the crank is immediately swung in a counter-clockwise direction, carrying the movable jaw to the operative locked position shown in full lines in Fig. 12. Because of the leverage arrangement the movable jaw will be cushioned in its downward movement so as not to forcibly strike the lower jaw, the action being very similar to a spring cushion effect. By adjusting the nut 94, the relation between the movable jaw and its actuating means may be varied so that a very fine adjustment may be effected to bring the movable jaw into compressing engagement with the key-blank and simultaneously lock the same in engagement therewith by reason of alignment of said of the axes as mentioned. It will be apparent from the foregoing that an entirely unique key-blank holder has been provided by means of which a number of purposes are served by simply moving an operating crank to carry the movable jaw into and out of operative position. It should be understood, however, that the principal features of the invention are in no way limited to this particular form of a key-blank holder, and that any suitable means for holding a key might be mounted on the carriage 62 and serve equally well the purpose of securing the key blank to the carriage, although the key-blank holder shown serves exceptionally well.

Coming now to the cutting means, reference may be had especially to Figs. 1, 4, 5, 6, 9 and 11. The two cutters 97 and 98 are fixedly mounted respectively on spindles 99 and 101 journaled in parallel relation in bearings on the upper ends of frames 102 and 103, respectively mounted at their lower ends on shafts 104 and 105 rotatably mounted in bearings 106 fixed to the base 35. The cutter spindles are equipped with pulleys 107 adapted to be driven in opposite directions, as indicated by arrows in Fig. 4, so that the adjacent portions of the cutters travel downwardly. By reason of this construction the frames 102 and 103 may be swung laterally in unison on their respective pivots 104 and 105, either in the same or in opposite directions. In order to limit the approach of the cutters to each other, a pair of set screws 108 are provided, mounted respectively on said frames in co-axial and abutting relation, as shown. It will be evident that by adjusting the screws 108 the distance between the cutters may be varied and the cutters may also be properly positioned with respect to the key-blank holder. Said adjusting screws are maintained in abutting relation by means of an expansion spring 136

109 (Fig. 9) mounted on a bolt 111 connecting said frames in the manner shown and permitting the frames to be swung apart against the tension of the spring 109. It is desirable to swing the frames apart in order to simultaneously withdraw the cutters from engagement with a blank when the cutting has been completed, and means is employed for automatically effecting this result at the proper time. This means is operated in part by the cam 49 mentioned above and consists of a rod 112 interposed between the cutter frames and slidably mounted in the carriage 62, Fig. 5, parallel with the rod 64 and equipped at one end, as shown in Figs. 4 and 11, with a square head 113 adapted to be moved between and engaging a pair of rollers 114 mounted on the cutter frames to move the cutters apart and withdraw them from the key blank. For this purpose the rod 112 is moved longitudinally by means of a rock lever 115 pivoted intermediate its ends on the shaft 71 and pivoted at one end to the rod 112 in a pin and slot connection and equipped at its opposite end with a roller 116 in engagement with the cam 49. A contractile spring 117 connecting the lever 115 to a fixed part of the frame normally holds said lever in operative relation with its cam and at the same time urges the rod 112 in a retracting direction so as to withdraw its head 113 from operative engagement with the rollers 114. In operation, when the carriage 62 has been moved forwardly by the cam 61 to carry a key blank lengthwise between the cutters in a feed movement, the cutters will be moved apart at substantially the end of the feed movement by the action of cam 49 forcing the head 113 between the rollers 114. This will be apparent by reference to Fig. 8 in which it will be seen that the lever 115 will not be actuated by the cam 49 to advance the head 113 until the shaft 43 has been revolved approximately three quarters of a revolution at which point the inclined surface 118 of the cam 49 will engage the roller 116 causing the cutters to be moved apart. The cutters will be held apart momentarily until the key blank has been retracted, whereupon, due to the fall in the cam 49, the head 113 will be retracted to the position shown in Fig. 11, thereby bringing the cutters into operative position again.

Figure 1:
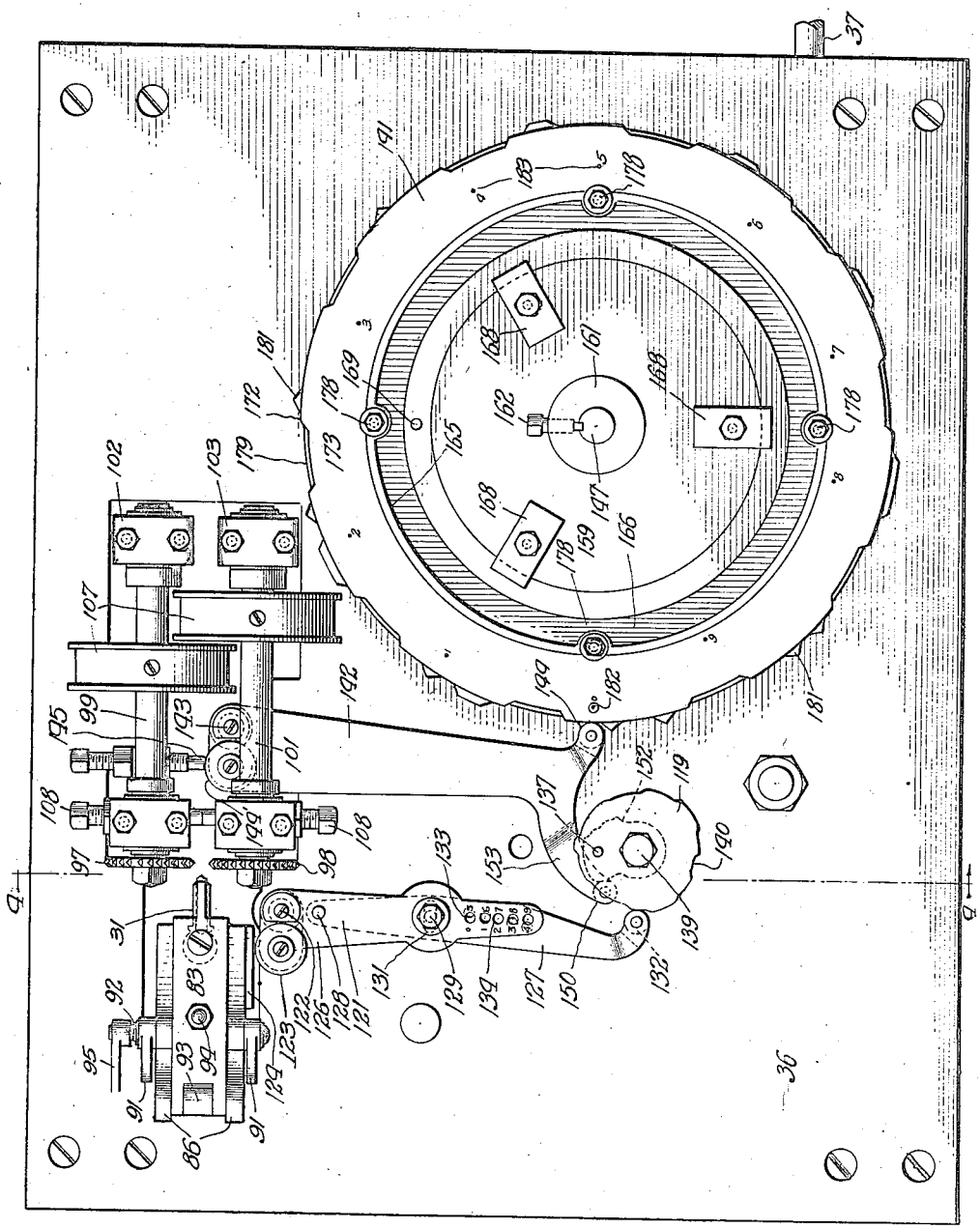
Figure 1 is a plan view of a key cutting machine embodying my improvements, showing the machine at rest in inoperative position.
Figure 2:
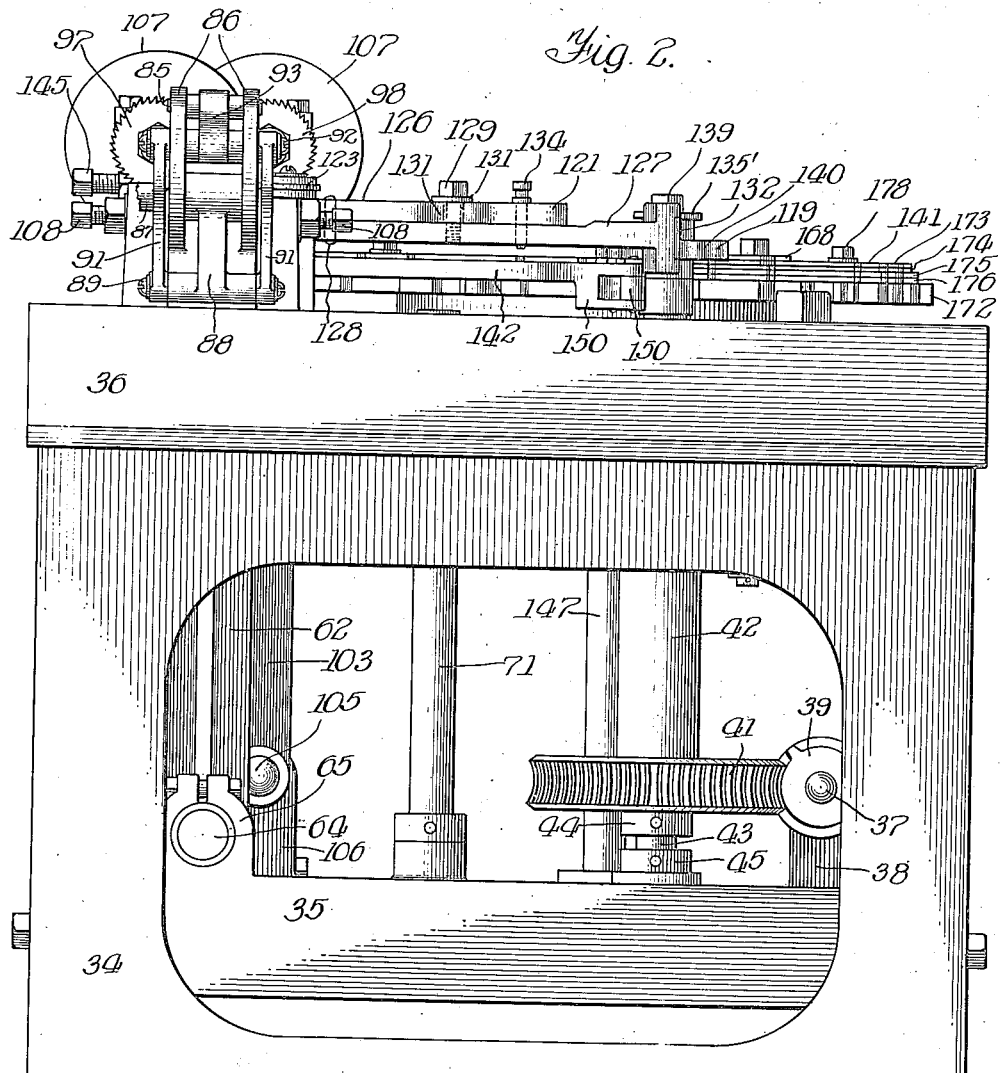
Figs. 2 and 3 are elevations of the left and front sides, respectively, of the machine as shown in Fig. 1.
Figure 3:
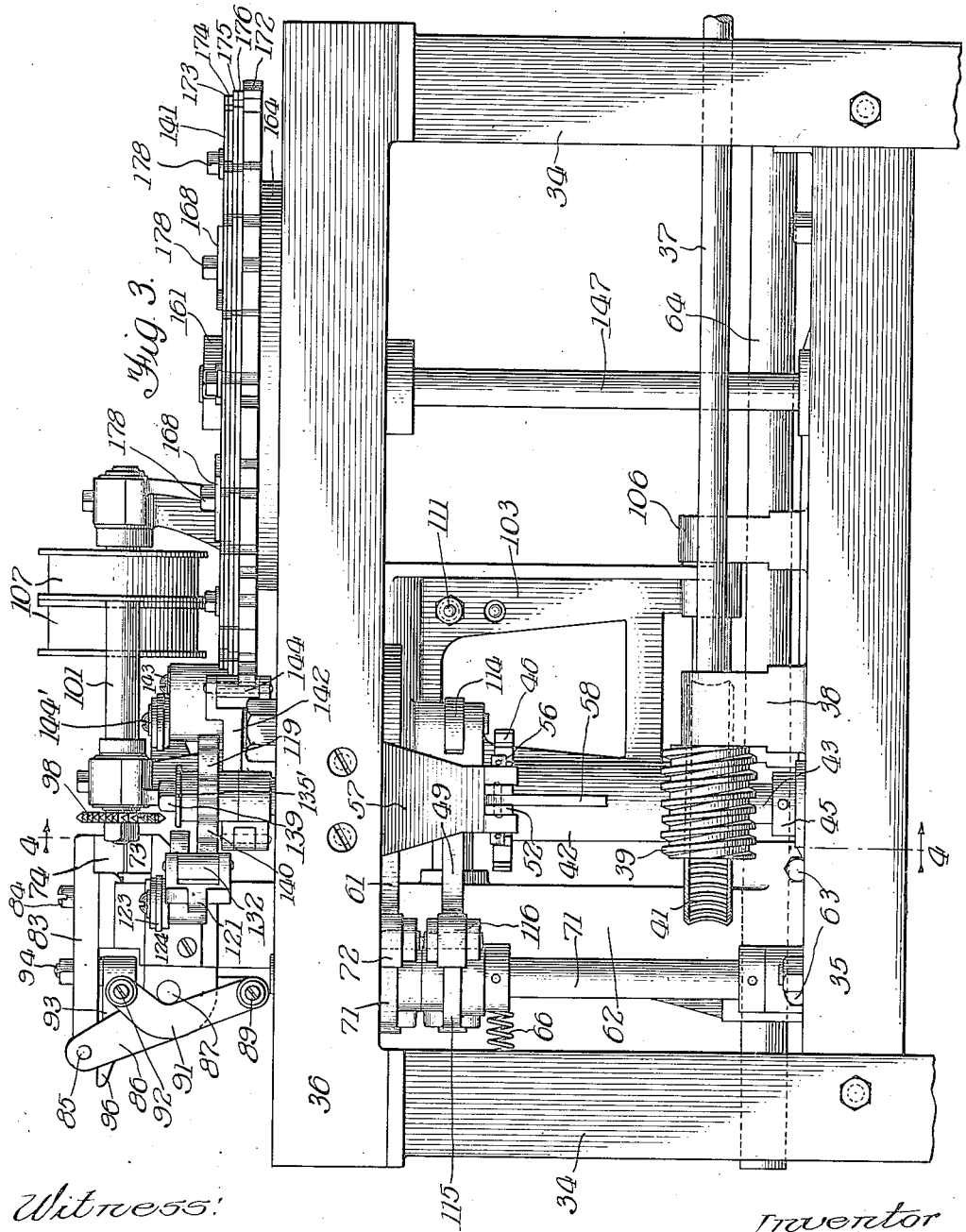

Having now described the manner in which a key blank is moved lengthwise between a pair of cutters in a constant feed movement to cause the opposed edges of the key to be cut, the cam control mechanism for moving both the key blank and cutters transversely of said feed movement to cut the irregular key faces will now be considered, taking first the means for moving the key-blank holder, reference being had especially to Figs. 1, 7 and 27. An irregular circular cam designated generally by reference character 119 described more particularly hereinafter and fixedly attached to the upper end of the shaft 43 is adapted to actuate a bell-crank lever designated generally by 121, which is pivoted to the frame at 122 and carries on its short arm a roller 123 against which the face 124 of the carriage 62 is urged by a contractile spring 125, Fig. 10, connecting said carriage to a fixed part of the frame. Viewing Fig. 1, it will be evident that the irregularities of the cam 119 will be imparted to the key-blank holder through the agency of the lever 121, causing the key-blank holder while traveling lengthwise to be moved transversely in short quick movements. For reasons mentioned later, the long arm of the bell-crank lever 121 is formed in two sections 126 and 127 pivotally connected together at 128 and adjustably connected by means of a bolt 129 threaded in the lever section 127 and passing through a slot 131 in the lever section 126, the lever section 127 being equipped with a roller 132 of sufficient width to engage the cam 119 in either of two adjusted positions of the latter as will appear hereinafter. In order to change the effect of the cam 119 on the key-blank holder, the lever sections 126 and 127 may be relatively adjusted by loosening the bolt 129 and adjusting the levers on the pivot 128 so as to change the relative relation of the rollers 123 and 132 at the extreme ends of the lever. Means is provided for setting the lever sections in any of a plurality, (five in the present instance) of relatively different positions and consists of a series of holes 133 in said lever sections through any two registering holes of which a pin 134 may be passed when any one of the five adjustments is made, the pin being shown in the present instance in the centermost holes. As shown in Fig. 1, the lever section 126 contains numerals on opposite sides of the holes arranged consecutively 0, 1, 2, 3 and 4 on one side and 5, 6, 7, 8, and 9 on the other side, for a purpose concerned in adjusting the lever sections according to a method described later. It will be apparent that by setting the pin 134 in any of the other holes, the tumbler faces on the key blank will be cut at a distance from the medial line of the blank different from what they would be cut when the pin is in hole 2 or 7, whichever of these numbers may be considered as representing this position. Referring now to Figs. 7 and 27, the cam 119 removably mounted on a sleeve 135 keyed to the shaft 43 and provided with a radial flange 136, is adapted to be rotatably adjusted on said flange 136 and set in any of a plurality of positions by engaging a pin 137 carried by the cam in any of a series of holes 138 circumferentially spaced about said flange. The collar 135 may be removably secured to the shaft 43 by means of an end plate 135' retained is position by a screw 139. The number of adjustments of the cam 119 relatively to the shaft 43 and the manner and purpose for which these adjustments are made will be described later when considering the cutting of a predetermined number of keys, it being sufficient to note at present that there are 23 evenly spaced holes in the flange 136, numbered on the upper face of said flange, as shown in Fig. 27, from 0 to 22 inclusive and within these numbers from 23 to 45 inclusive. The periphery of the cam 119 is shaped to provide a plurality of equally spaced flat spots 140 corresponding in number to the holes 138 so that the key-blank holder will be momentarily held against transverse or sidewise movement at regular intervals to produce in conjunction with the cutters the short flat tumbler surfaces.

For moving the cutters transversely as a unit in the operation of cutting a key, a cam control device is employed somewhat similar to that above described for moving the key-blank holder transversely. This means, best shown in a general way in Fig. 1, consists of a rotary cam designated generally by reference character 141 adapted to actuate a lever 142 pivotally mounted at 143 on the frame and equipped at one end with a roller 144 and at its opposite end with a roller 144' offset from said pivot 143 and engaged by the end of an adjusting screw 145 carried by the cutter frame 102 and constantly urged into said engagement by an expansion spring 146 (Fig. 9) as will be obvious. Thus, as the cam 141 is revolved, its irregular peripheral cam face will actuate the lever 142, imparting short transverse movements to the cutters as a unit, since the same are held in fixed relative relation by the spring 109. The cam 141 is fixed to a shaft 147 journaled on the frame and equipped, as shown in Fig. 6, with a relatively large spur gear 148 driven from and in the same direction as the gear 149 on the shaft 43 through the intermediary of a gear 151, so that the cams 119 and 141 are simultaneously revolved each time the machine is put into operation, causing both the key-blank holder and cutters to be moved transversely in independent movements controlled by the respective cam devices. And during each period of operation in which a key is cut, the cam 119 is turned through a complete revolution while the cam 141 is turned through approximately only a quarter of a revolution according to the present arrangement. More specifically, the gear ratio between the shafts 43 and 147 is 100 to 23, so that the cam 119 is revolved 100 times to each 23 revolutions of the cam 141. This particular gear ratio together with other numerals or indicia on the cam control mechanism designating series of adjustments is essential to illustrating the particular example I have chosen for demonstrating the principles of my invention.

Assuming that the periphery of the cam 141 is of a different shape from that of the cam 119 it will be evident that when the machine is put in operation with a key-blank properly carried by the holder, the key blank and cutters will be simultaneously and independently moved transversely in different movements according to the effect produced by their respective cams, so that while the key blank is fed lengthwise irregular faces will be cut on the opposed edges of the key blank, such faces being the result of the joint transverse movements mentioned, it being understood that at the end of the cutting operation the cutters will be automatically withdrawn from the blank and the same will be retracted to a rest position as described above. Upon again putting the machine into operation to cut a new key, its tumbler surfaces will be cut differently from the preceding ones, even although the cam 119 travels through the same movement as in the previous instance. The change is automatically effected and caused by the fact that the next succeeding portion of the cam 141, approximately one-quarter of its peripheral length, is employed in conjunction with the cam 119 for cutting the key. Therefore, the cutters will be moved transversely in different movements from their preceding movements, thereby modifying the final result. The peripheries of the cams 119 and 141 being properly designed will enable the cam 119 to be revolved 100 times before the starting points of the cams coincide. In other words, because of the 100 to 23 ratio between the cams 119 and 141, the joint effects of said cams during each revolution of the cam 119 until one hundred revolutions have been made, will be different. Consequently, one hundred keys may be cut, each individually different from the other without changing or adjusting a single part of the machine.

Before entering into a description of the particular construction in which I have embodied the cam 141, the means will be considered whereby a certain portion of all the keys is identically cut irrespective of the differently irregular tumbler faces thereof. As pointed out in my co-pending application mentioned above it is desirable to provide each key near its inner end with a tooth higher than any of the other projections or tumbler surfaces so that said tooth will engage with the tumblers in succession when withdrawing the key from the lock and positively move each of the tumblers into a locking position. It will be manifest from the cam action just described in which each of a series of keys is cut differently, that means auxiliary to the cams 119 and 141 must be provided for accomplishing this common result on every key without interfering with the variable result produced by the two main cams. Referring to Figs. 1, 7 and 28, this means consists of a cam 152 keyed to the shaft 43 immediately below the cam 119 adapted to actuate an extension 153 of the lever 142 to produce the desired result, that is, of cutting a comparatively high tooth on one of the edges of each key during the initial cutting operation. On the finished key shown in Fig. 18, such a tooth is indicated by reference character 154. It is produced by the cam 152 during the initial operation of the machine. Viewing Fig. 1, it will be seen that the cam 152 while revolving in a counter-clockwise direction will actuate the lever 142 withdrawing the same from operative engagement with the cam 141 and moving the cutters to an extreme left-hand position viewed from the blank-holder side of the machine, and will hold the cutters in this position until the point 155 on the cam 152 reaches the roller 150. In the meantime the key blank will have been moved lengthwise between the cutters. Since the left cutter in the position mentioned is at its greatest distance from the medial line of the key blank when the latter engages the cutters, it will be obvious that a high tooth similar to 154 will be produced on the left edge of the key and the right edge will be cut comparatively deep. Immediately after the left cutter has engaged the blank so as to cut or ride over the tooth 154, that is, when the outer edge of the tooth 154, that is, when the point 155 on the cam 152 has been reached, the fall 156 in said cam will cause the cutters to be moved to the right, cutting a valley or depression in the left edge of the blank until the roller 144 of the lever 142 engages the periphery of the cam 141 and is actuated thereby independently of the cam 152 to produce in conjunction with the cam 119 the tumbler surfaces as already described. In the event that the roller 144 of the lever 142 engages a high point of the cam 141 when moved into engagement therewith, the first tumbler surface on the left edge of the blank will be cut at a maximum height from the medial line of the key, in substantially the manner that the first tumbler surface is cut on the key shown in Fig. 18, located on the line B. If, however, a low portion of the cam 141 happens to be located opposite the roller 144 when the same is moved into operative position, a comparatively low tumbler surface will be cut on said left edge of the key, and to prevent too low a surface being cut, the points 157 and 158 are formed on the cam 152 and either one or both of these points will, in the instance mentioned, cause tumbler surfaces to be formed, or rather, will actuate the cutters and produce in conjunction with the transverse movement of the key blank either one or two tumbler surfaces, dependent upon whether or not the roller 144 is first engaged by a sufficiently high cam surface of cam 141. From the foregoing it will be readily apparent that upon each key a relatively high tooth will be cut at the extreme inner end thereof, this result being produced without interfering with the automatic action of the cams for producing the irregular tumbler surfaces in the different cam periods.

As already described in a general way, a series of individually different keys may be cut by the joint action of the cams 119 and 141 without making an adjustment of any kind, the change taking place automatically, due to the construction of the cam mechanism and the relative timing of the cams. The feature now to be considered resides in the construction and function of the cam 141 and the manner in which various adjustments are made to change the cam surface thereof in a predetermined manner. This construction is best shown in Figs. 1 and 19 to 26 inclusive. Referring particularly to Fig. 22, the cam structure, detachably secured to a central plate 159 having a hub 161 suitably secured by means of a key and set screw 162 to the shaft 147, is adapted to be rotated by said shaft 147 in co-operative relation to the upper surface 163 of a ring 164 rigidly secured to the top 36 of the frame. The main body portion of the cam structure designated generally by reference character 165 is shaped to provide an annular web 166 fitting a peripheral groove or countersink 167 of the plate 159 in either the position shown in Fig. 22 or in an inverted position. When in either position, clamps 168 or any other suitable means may be employed for rigidly securing the cam body 165 to the plate 159, so that the said cam body may be rotatably adjusted on said plate 159 and also removed therefrom and replaced thereon in an inverted position. For the purpose of accurately positioning the cam body 165 on the plate 159 so that the said cam body may be rotatably adjusted and set in any desired position thereon, I have provided suitable means in the form of a pin 169 passing through the web 166 and adapted to fittingly engage in any one of a plurality of circumferentially spaced holes 171 in the plate 159. There are in the present instance 100 of these holes equally spaced apart, which correspond with graduations on the face 163 in the form of 100 evenly spaced marks numbered at each 5 points, as shown in Figs. 20, 23 and 24, for a purpose described later. In addition to the peripheral surface 172 of the cam body 165 being irregularly shaped to serve as a cam, I have provided peripheral cam surfaces in the form of a plurality of flat circular rings 173, 174, 175 and 176 adjustably secured in a peripheral channel or countersink 177 of the body 165 by means of bolts 178. The peripheries of these rings provide cam surfaces, so that by setting the rings in relatively different positions, a large number of changes may be made in the peripheral contour of the cam 141. It should be understood, however, that my invention is not limited to the use of these adjustable cam rings, as it will be already apparent that the machine may be operated to produce a large number of individually different keys without these rings; but, as will be more readily understood hereinafter, the rings serve to enable a greater multiplicity of individually different keys to be cut, and the same or equivalent cam adjustments or variations are necessary to produce the large number of keys desired. In conformity with the example I have assumed of adjusting the parts according to a certain unit of operation to illustrate in a particular manner the method of operation, the cam faces 172 and 176 inclusive have been designed in connection with the cam 119 and the timed relation between the cams 119 and 141 so that tumbler surfaces will be cut at predetermined and equally spaced points longitudinally of a key blank during any of the relatively adjusted positions of said peripheral cam faces. It is desired first that the periphery of the cam 141 should contain 100 equally spaced points or spots of varying heights, which points coincide in rotation with the 23 spots on the cam 119 so that tumbler surfaces will be produced on a key at equally spaced intervals, these points coinciding in any set adjustment of the cam rings of the cam 141. In order that a predetermined control of the cutters to the ends desired may be effected, I have formed the periphery 172 of the cam body 165 and also the peripheries of the plates 173 to 176 inclusive with a plurality of equally spaced and shaped depressions 179. As shown in Fig. 19, the depressions in the cam rings are in registration with those in the cam body 165, and since the peripheries of the rings are true circles concentric with the cam body 165, and the rings 175 and 176 are of the same diameter as the periphery of the main portion of said body 165, and the rings 173 and 174 are of less diameter so as to be located substantially midway between the peripheries of the rings 175 and 176 and the bottom of the depressions 179, the rings will not function to actuate the lever 142 until they are rotatably adjusted relatively to the cam body 165, so that portions of said rings will project into the depression 179 of the said cam body. The cam face 172, in addition to being formed with said depressions 179, is formed intermediate the same with projecting cam portions 181 of relatively different shapes, as shown plainly in Fig. 19. The cam 141 is revolved 0.23 of a revolution during the period each key is cut and at the ratio of 23 to 100 with respect to the cam 119, so that a different portion of the periphery of the cam 141 will be effective during each rotation of the cam 119 to cut in synchronism therewith a single key, until 100 keys have been cut. It will be noted that while the cam 141 is revolved 0.23 of a revolution for each period of operation, only 0.10 of a revolution is employed to cut the effective tumbler surfaces of a key, one tumbler surface being cut at each 0.01 of a revolution of the cam 141 which corresponds with 1/23 of a revolution of the cam 119. The effective tumbler surfaces, ten in number, are located between the lines A—B, Fig. 18, as mentioned above.

For the purpose of varying the effect of the cam 141, the rings 173 to 176 inclusive, are adjustable to a plurality of predetermined positions thereby varying the configuration of each depression 179 in the same manner. Further carrying out the example of adjustment mentioned above and which will be more clearly described later, the said cam rings are adjustable to provide ten variations. As shown in Fig. 22, the rings are held in fixed relative relation and also fixed in connection with the cam body 165 by means of a pin 182 passing through aligned holes in said parts. To adjust the rings the pin 182 will be removed and the rings will be rotatably adjusted until certain holes in said rings and main cam are in alignment, whereupon the pin 182 will be inserted in such holes, fixing the parts against relative displacement. There are 10 circumferentially spaced holes 183 in the cam body 165 arranged in spiral order, Fig. 1, so as to lie in non-intersecting paths at different radial distances from the center of the cam, each of these holes representing a station of adjustment. In proximity to each of these stations, each of the cam rings 173, 174, 175 and 176 is provided with a hole arranged in predetermined relative relation to its depressions 179. The ten holes in each ring lie in non-intersecting paths in similar fashion to the holes 83, so that when the holes in proximity to each station are aligned with the holes 183, a predetermined adjustment of the cam rings will be effected, the 10 adjustments in all causing 10 distinct variations in the depressions 179. These variations are represented diagrammatically in Fig. 29 and occur at the correspondingly numbered locations on the top surface of the ring 173, Fig. 1. It will be obvious that the first shape 0 represents the full shape of a depression 179 and, therefore, corresponds with the cam as shown with the pin 182 at the 0 station. To illustrate a particular instance of adjustment, reference may be had to Fig. 21, which shows the relative relation of the holes at station No. 1 when the pin 182 is in the No. 0 adjustment. In order to align the holes at No. 1 station the ring 175 must be moved in a clockwise direction, and this ring being one having the larger diameter will produce the effect shown opposite numeral 1 in Fig. 29, it being remembered that the same adjustment takes place at each depression 179. During the next adjustment either the ring 175 or 176 will be revolved still further in a clockwise direction producing the effect 2 shown in Fig. 29. In other words there are ten holes in each cam ring and each hole is adapted to register with but a single hole 183 so that when making any one of the ten adjustments the cam rings must be so positioned that four of the holes therein are in registration with the desired hole 183. And in this way the remaining adjustments may be made, producing the various effects shown in Fig. 29. For purpose of clarity, another illustration is shown in Fig. 26 of the relative relation of the holes in the cam rings at the station 5 with the pin 181 in station 0. To align the holes the ring 175 must be moved in a clockwise direction, and the ring 176 in a counterclockwise direction until their respective holes are in alignment with the hole 183, which produces the centrally disposed and relatively narrow depression shown in Fig. 29 opposite 5. While I have illustrated a particular method of adjustment, it should be understood that this might be considerably varied, or any other form of adjustment might be employed for producing the various cam effects.

The operation of the machine in cutting a large number of individually different keys according to a predetermined method and automatically maintaining by the machine itself an accurate record of the cam period through which each key is cut, will now be described. It will be assumed that all pins that serve for adjusting different parts of the cam mechanism are set at their 0 positions. This comprises pin 134 for adjusting the lever 121 which actuates the key-blank holder, pin 137 for adjusting the cam 119 for actuating said lever 121, pin 169 for rotatably adjusting the cam 141 with respect to the shaft 147 and pin 182 for adjusting the cam rings on said cam 141. With these pins, therefore, in No. 0 positions, 100 individually different keys may be cut in succession in the manner described above, the keys being consecutively numbered 0 to 99. This is the only marking or record that is made aside from the permanent indicia contained by the cam mechanism itself and consisting of the various numerals employed to designate the different adjustments. This series of keys, 100 in number, may be said to have been cut during a unit of operation of the machine and each key has been cut during a certain period of the unit, represented by the number on the key and produced by a complete revolution of the cam 119 and 0.23 of a revolution of the cam 141. By adjusting the pin 134 from hole No. 0 into hole No. 1, the resultant effect of the cam mechanism will be varied so that each key cut during the next unit of operation will be different from any key cut in the preceding unit of operation. Therefore, 100 new and different keys may be cut, being numbered consecutively 100 to 199. And so on, three more adjustments of the pin 134 may be made, thereby producing in all 500 keys each of which is cut to a different shape. It will be here noted that the body 165 of the cam 141 should contain on its upper surface the mark "0—499", Fig. 1, meaning that this number of keys are to be cut with this side of the cam uppermost. The opposite side of the cam should contain the mark "499—999". Since all of the adjustments possible of the lever 121 have been made, the cam 141 will be reversed, placing the pin 169 at 0 and the machine will be operated through five more units of operation distinguished by adjusting the pin 134 in the holes 5 to 9 inclusive thereby going through the same adjustment as in the first five units of operation with the exception that the relation of the cam 141 to the lever 121 is different, so that the keys produced during these later periods of operations are each distinctly different from any other key that has been cut. These later keys will be marked consecutively "500 to 999", thus making 1000 keys in all. The cam 141 will then be reversed, placing its side marked "0—499" uppermost with its pin 169 at 0 and pin 134 will be adjusted back in hole No. 0. Cam 119 will now be adjusted one position in a clockwise direction, that is, its pin 137 will be moved from 0 to 1. This again changes the entire effect of the cam mechanism, and, in fact, each adjustment of the cam 119 covers a range of 1000 keys. In other words, for each adjustment of this cam the machine is operated through 10 units of operation in the manner just described, the pin 134 being adjusted after each 100 keys have been cut and the cam 141 being reversed at the end of each 500 keys. Thus during the operation with pin 137 in hole No. 1, 1000 keys will be cut numbered consecutively 1000 to 1999. And so on, by adjusting the cam 119 at the end of each 10 units of operation, 23,000 keys will be cut. The cam 119 should contain on its upper face the numbers 0 to 22,999, meaning that the first 23,000 keys will be cut with this side of the cam uppermost. The underside of the cam should contain the marking "23,000 to 45,999". The numerals 0 to 23 shown in Fig. 27 contained on the top surface of the flange 136 at the inner side of the holes 138, therefore, refer to the first 23,000 keys to be cut with the cam 119 mounted as shown and the set of numerals ranging from 23 to 45 representing the second 23,000 keys with the cam 119 in a reversed position. This enables accurate positioning of the cam 119 and also serves as a record of the various adjustments thereof. By consecutively adjusting the cam 119 to the 46 positions designated, 46,000 keys may be cut, it being understood that in cutting each one thousand keys there are 10 units of operation and in each unit of operation a series of 100 different keys are cut. This number of keys may be doubled by providing new jaws in the key-blank holder for holding the blank in a reversed position, so that the faces cut on the opposed edges of a key in this position are on opposite sides of the rib 31 of the key from those cut during a corresponding period with the rib 31 lowermost. When the jaws of the key-blank holder have been changed to carry the key blanks in a reversed manner, it will be understood that the method of operation just described will be duplicated, the keys being numbered "46,000 to 91,999", thus producing a total of 92,000 keys, the tumbler surfaces of which are individually different. This series of operations may be repeated with the cam rings 172, 173, 174, 175 and 176 set successively in the ten different positions of adjustment above described, thereby making a total of 460,000 different keys that may be produced with the key blank held in upright position and an additional 460,000 different keys that may be produced with the key blank held in reversed or inverted position,—a total of 920,000 different keys in all.

As stated in the preface it is desirable to duplicate any key independently of using the key to be duplicated as a pattern and so far as manufacturing a large number of keys is concerned it will be seen that there has been no memorandum or other record kept of the variations in the different keys, except that the mechanism itself is designed and contains indicia for the purpose not only of producing the large number of variations in systematic order but of doing this according to a predetermined method and so that any particular cam period may be retraced to reproduce a key if the number thereof is given. The locks made to fit the keys are numbered to correspond with their respective keys, so that if a key is lost the number on the lock gives the desired combination to produce a new key. This number, for instance 228,256, in fact, signifies more than that this particular key was the 228,257th key cut. It forms a key symbol of a particular combination of the relatively adjustable parts of the cam mechanism under which such mechanism was operated to produce this particular key. In other words, it is a key symbol of the cam period during which the key was cut. The numbers in the different positions, for instance, the units, tens, hundreds, etc., serve as keys to setting the various pins according to the indicia on the cam mechanism to operate the same through the desired cam period. For example, of the numbers in the key mentioned, viz., key 228,256, the numbers occupying the unit's and ten's places, viz., 56, are a key to setting the pin 169. The number occupying the hundred's place, viz., 2, is the key to setting the pin 134, and so on, the number occupying the thousand's place, 8, refers to pin 182 and the number 22 refers to the pin 137. To duplicate this key it is first desired to know at what particular position the cam 141 was when commencing the operation, and since the cam 141 in its rotation is a variable at the ratio of 23 to 100 with respect to the cam 119, the number 56 has no particular significance, but by multiplying 56 by 0.23 the product will be 11.80, showing that the cam 141 has revolved 11.80 times before commencing the cam period to produce the key in question. In order to expedite in each case the step of calculating to establish this position and setting of the cam therein, I have prepared a chart shown in Fig. 30, to which the operator may refer. The vertical columns designated "Key No." refer to keys 0 to 99 in the unit's and ten's places of the identification number on all keys. The numbers in the column designated "Pin No." which refer to the graduations on the face 163 and to adjustment of the pin 169 therein are the result of calculations to determine the precise position of the cam 141 at the commencement of any cam period. In the instance in question, 56 will be found in the third key number column to the right and opposite the number 56 will be found the number 88. This means that cam 141 should be rotatably adjusted relative to the shaft 147 until the pin 169 will enter the hole 171 opposite the graduation 88, in which position the cam will be locked by the clamps 168. It will, of course, be understood that if the units, tens and hundreds number is less than 499, the cam 141 should be positioned with its 0—4999 side uppermost and if 500 or over, the reverse side of the cam should be positioned uppermost. Since 256 is less than 499, the 0—449 side of the cam 141 will be placed uppermost with its pin 169 in hole 88. The number occupying the hundred's place, having reference to adjustment of the pin 134, being 2, means that this pin will be set in hole No. 2, thereby properly adjusting the lever 121. The number occupying the thousand's place, viz. 8, means that the pin 182 should be set in the No. 8 adjustment of the cam rings on the cam 141 so that the cam surface at each depression 179 will have the configuration represented by 8 in Fig. 29. Since the numbers occupying the ten-thousand's and hundred-thousand's places are used as one key, referring to the pin 137, this pin will be set in hole 22. Upon now putting the machine in operation a key will be reproduced identically the same as the one previously cut and marked "228,256." It will thus be apparent that any key made by the machine described may be very easily and readily duplicated, since the number of the key to be duplicated serves as a key symbol for setting the cam mechanism to operate through the particular cam period to reproduce the desired key. It will be noted that the pin 169 is employed only in the process of reproducing keys, and during the manufacturing or cutting of keys it is maintained always in the hole opposite 0 on the face 163. The 460,000 keys that may be made with the key blank reversed from the position shown might be distinguished from the others by providing a suitable letter as a prefix to that number. That is, a key made during the cam period described in detail as an example, but with the jaws of the key-blank holder reversed, would be numbered U—228,256, which key would be different from key 228,256 in the respect that although similar tumbler faces would be cut they would be located on opposite sides of the rib or channel 31 from such faces on said key 228,256.

It is believed that the foregoing conveys a clear understanding of the principle and mode of operation of the invention whereby the objects prefaced are accomplished, and it should be understood that various alterations and changes might be made without departing from the spirit and scope of the invention as expressed in the appended claims.

I claim:

1. In a key-cutting machine, the combination with a key-blank holder and key cutting means relatively movable lengthwise of the key blank in a feed movement, of mechanism for moving both the key-blank holder and said cutting means during and transversely of said feed movement in relatively different predetermined irregular movements which jointly produce an irregular key face.

2. In a key cutting machine, the combination of a key-blank holder, key cutting means, means for relatively moving the key-blank holder and key cutting means lengthwise of the key blank in a feed movement, and means for moving both the key-blank holder and the key cutting means transversely of the longitudinal axis of the key blank to produce an irregular key face.

3. In a key-cutting machine, the combination with a key-blank holder and key-cutting means relatively movable lengthwise of the key blank in a feed movement, of cam-controlled means for moving both the key-blank holder and cutting means during and transversely of said lengthwise movement in relatively different transverse movements.

4. In a key cutting machine, the combination of a key-blank holder and key cutting means relatively movable lengthwise of the blank in a feed movement, and means for imparting independent transverse movements to the key-blank holder and key cutting means which jointly produce a plurality of longitudinally spaced tumbler faces parallel with and at different distances from the longitudinal medial axis of the key blank.

5. In a key cutting machine, the combination of a key-blank holder and key cutting means relatively movable lengthwise of the key blank in a feed movement, separate cam-controlled means for respectively moving the key-blank holder and key cutting means transversely of the longitudinal axis of the key blank, and means for simultaneously operating said cam-controlled means in predetermined timed relation.

6. In a key cutting machine, the combination of a key-blank holder, key cutting means, means for relatively moving the key-blank holder and cutting means lengthwise of the key blank in a feed movement, and cam operated means for respectively moving the key-blank holder and the key cutting means transversely of the longitudinal axis of the key blank in successive cam periods each producing a differently irregular key face.

7. In a key-cutting machine, the combination with a key-blank holder and key-cutting means relatively movable lengthwise of the key blank in a feed movement, of cam controlled means for moving the key-cutting means during and transversely of said lengthwise feed movement to produce an irregular face on the key blank, another cam controlled means for moving the key blank holder during and transversely of said lengthwise feed movement in a movement different from that of the key-cutting means, the effective lengths of the cams of both of said cam controlled means being different and the cams being driven at different speeds, whereby a number of keys may be produced having differently irregular key faces.

8. In a key-cutting machine, the combination with a key-blank holder and key-cutting means relatively movable to cut an irregular key face, of cam controlled mechanism for determining the irregularity of said face and for producing a plurality of differently irregular faces, and a rotatable cam for causing a given portion of each key face to be cut identical in design.

9. In a key-cutting machine, mechanism for separately cutting a differently irregular longitudinal face having tumbler surfaces on each of a plurality of keys, and means for causing an end portion of each key to be cut at a greater distance from the medial line thereof than the distance of any tumbler surface in the irregular face from said medial line, such end portions on all keys so cut being duplicates of each other.

10. In a key-cutting machine, the combination of means for cutting longitudinally spaced tumbler faces on a key blank at different distances from the medial line thereof, cam controlled means for operating the cutting means to cut in succession a plurality of keys each having a differently irregular tumbler face, and means for causing said cutting means to cut a high point at a given portion of each key at a greater distance from the medial line of the key than the distance of any tumbler face from said medial line.

11. In a key-cutting machine, the combination of cam controlled mechanism for cutting a plurality of keys each with differently irregular longitudinal faces, and means for automatically causing a predetermined portion of each key face to be uniformly cut to provide a substantially uniform lateral projection.

12. In a key-cutting machine, the combination with a key-blank holder and key-cutting means relatively movable to cut an irregular longitudinal face on the blank, of rotatable cam controlled mechanism for relatively moving the key-blank holder and key-cutting means and operable in successive period movements during each of which a differently irregular key face will be cut, said means containing indicia representative of said periods, said cam controlled mechanism being capable of being set by reference to corresponding indicia on the keys to operate through any period to cut a duplicate of the key produced during that period.

13. In a key-making machine, the combination with a key-blank holder and key-cutting means relatively movable to cut an irregular longitudinal face on the blank, of cam controlled mechanism for determining said cutting movement and having parts consecutively adjustable in accordance with indicia on the mechanism to cut in succession a plurality of different keys, said cam controlled mechanism controlling the reproduction of any particular key by setting said adjustable parts of the cam controlled mechanism according to corresponding indicia on the key to be reproduced.

14. In a key-cutting machine, the combination with a key-blank holder and cutting means relatively movable to cut an irregular longitudinal face on the blank, of cam controlled mechanism for determining said cutting movement and for automatically cutting in succession a given series of differently irregular key faces, including means for effecting adjustments whereby a plurality of series of keys may be cut, said adjusting means bearing indicia identifying different periods of operation of the cam mechanism, whereby any key may be duplicated by setting the mechanism to operate through the particular period of operation designated by corresponding indicia on the key to be duplicated.

15. In a key-cutting machine, the combination with a key-blank holder and key-cutting means relatively movable lengthwise of the key blank and each movable relatively to the other transversely of said lengthwise movement whereby to cut an irregular face lengthwise of the key blank, of separate cam controlled means for moving the key-blank holder and cutting means in said transverse directions, and means for simultaneously operating both said cam controlled means in successive relatively different periods of movement during which keys having different key faces are respectively produced.

16. In a key-cutting machine, the combination with a key-blank holder and key-cutting means relatively movable lengthwise of the key blank and each movable relatively to the other transversely of said lengthwise movement whereby to cut an irregular face lengthwise of the key blank, of separate cam controlled means for moving the key-blank holder and cutting means in said transverse directions, one of said cam controlled means being operated throughout substantially its entire effective cam length for cutting each key and the other cam controlled means being operated through only a portion of its effective cam length for each key, whereby each key face is cut by the joint action produced by a like cam action on the part of one of said cam means and a relatively different cam action on the part of the other of said cam means.

17. In a key-cutting machine, cam controlled mechanism for successively cutting a predetermined number of key faces according to a predetermined cam action, said cam controlled mechanism containing key-identifying indicia representing different cam periods during which individually different key faces are cut, and said mechanism being capable of being set according to said indicia to duplicate any key without substitution of cams.

18. In a key-cutting machine, the combination with a key-blank holder and key-cutting means relatively movable to cut an irregular longitudinal face on a key blank, of a plurality of cam controlled devices simultaneously operating in timed relation through successive relatively different cam movements to cause said key cutting movement, and means for intermittently operating said cam controlled devices to cut a key at each period of operation, the cam controlled devices by reason of their relatively different cam movements automatically causing a differently irregular face to be cut on each key blank.

19. In a key-cutting machine, the combination with a key-blank holder and key-cutting means, of cam controlled means for relatively moving the key-blank holder and cutting means to cut an irregular face longitudinally of the key blank and successively operable in movements during each of which a different key face is cut, a series of these movements constituting a unit of operation, and means for varying the operative effect of said cam controlled means at the end of each unit of operation whereby to cause a new series of individually different keys to be cut.

20. In a key-cutting machine, the combination of a key-blank holder, key cutting means, a pair of circular cams, means actuated by the cams for relatively moving the key-blank-holder and cutting means to cut an irregular key face, and means for rotating said cam means through a given period for cutting each key, one cam being rotated a complete revolution for each key and the other cam only a partial revolution.

21. In a key-cutting machine, the combination of a key-blank holder, key cutting means, a pair of circular cams, means actuated by the cams to relatively move the key-blank holder and cutting means to cut a key face longitudinally of the blank, and means for rotating said cams in timed relation whereby the joint action of the cams for a given period of rotation will produce an irregular key face, the period of rotation for cutting each key consisting of a substantially complete revolution of one of the cams and but a portion of a revolution of the other cam, whereby, due to the timed relation of said cams, a different key will be cut at each period of rotation until given starting points on both cams coincide after a plurality of different keys have been cut.

22. In a key-cutting machine, the combination of a key-blank holder, key-cutting means, a pair of circular cams means actuated by the cams to relatively move the key-blank holder and cutting means to cut a key face longitudinally of the blank, means for rotating said cams in timed relation whereby the joint action of the cams for a given period of rotation will produce an irregular key face, the period of rotation for cutting each key consisting of a substantially complete revolution of one of the cams and but a portion of a revolution of the other cam, whereby, due to the timed relation of said cams, a different key will be cut at each period of rotation until given starting points on both cams coincide after a series of individually different keys have been cut, and means for adjusting said cam-actuated means whereby to change the operative effect of said cams to cut a new series of individually different keys.

23. In a key cutting machine, a key-blank holder comprising a blank-holder frame having a stationary jaw shaped to receive a key blank, a jaw pivotally mounted on said frame and adapted to swing into and out of a blank-holding position, an oscillatory operating member pivotally mounted on the frame, and a connection between the operating member and the pivoted jaw for swinging the latter into and out of said blank-holding position and for automatically locking the jaw in said position.

24. In a key cutting machine, a key-blank holder having a part adapted to receive a key blank and having another part pivotally mounted at one end and shaped at its opposite end to hold the key blank in position on the first mentioned part, and operating means pivotally connected to said movable part intermediate the ends thereof for swinging the same about its pivot into and out of operative position and for automatically locking the movable part in said operative position upon being moved thereto.

25. In a key cutting machine, a key-blank holder having a part adapted to receive a key blank and having another part pivotally mounted at one end and shaped at its opposite end to hold the key blank in position on the first mentioned part, operating means pivotally connected to said movable part intermediate the ends thereof, for swinging the same about its pivot into and out of operative position upon being moved thereto, and means for effecting an adjustment between said operating means and the pivoted part whereby the clamping effect of the latter may be varied.

26. In a key-cutting machine, the combination of a pair of frames pivotally mounted on parallel axes and equipped at their free ends with rotary cutters operating in a common plane on axes parallel to said frame axes whereby the frames are movable to move the cutters relatively to each other and in unison in their plane of rotation, a key-blank holder, means for moving said holder to move the blank lengthwise between said cutters parallel with their axes of rotation to cut opposed edges of the blank, means operable between the cutter frames to hold them yieldingly in fixed relative relation to maintain a constant distance between the cutters during the cutting operation, means for oscillating said frames in unison to cut irregular faces on said edges of the key blank, and means for spreading said frames apart to withdraw the cutters from the blank at a predetermined point in the feed movement thereof.

27. In a key-cutting machine, the combination of a pair of frames pivotally mounted on parallel axes and equipped at their free ends with rotary cutters operating in a common plane on axes parallel to said frame axes whereby the frames are movable to move the cutters relatively to each other and in unison in their plane of rotation, a key-blank holder, means for moving said holder to move the blank lengthwise between said cutters parallel with their axes of rotation to cut opposed edges of the blank, means operable between the cutter frames to hold them yieldingly in fixed relative relation to maintain a constant distance between the cutters during the cutting operation, a cam device for determining the shape of a key face, a lever actuated by said cam device and co-operable with said frames to oscillate the latter in unison as the key blank is fed between the cutters so as to cut irregular faces on the blank, and means for spreading said frames apart at a predetermined point in the feed movement of the key to withdraw the blank from the cutters.

28. In a key cutting machine, the combination of a key-blank holder, cutting means, cam-operated means for relatively moving the key-blank holder and cutting means transversely of the longitudinal axis of the key blank to produce an irregular key face, and means put into operation at will for moving said cam-operated means through a single period of operation to cut a single key, said cam-operated means, upon the next succeeding operation, automatically causing a differently irregular key face to be cut.

29. In a key cutting machine, cutting means, a key-blank holder mounted to move lengthwise in a feed movement and laterally to produce an irregular key face, a rock lever for moving the key-blank holder laterally during the feed movement of the holder, and a cam for rocking said lever.

30. In a key cutting machine, cutting means, a key-blank holder mounted to move lengthwise in a feed movement and laterally to produce an irregular key face, a rock lever for moving the key-blank holder laterally during the feed movement of the holder, a cam for rocking said lever, a second rock lever for moving the cutting means transversely of the longitudinal axis of the blank, a second cam for rocking the second lever, and means for revolving the cams in synchronism.

31. In a key cutting machine, cutting means, a key-blank holder mounted to move lengthwise in a feed movement and laterally to produce an irregular key face, a rock lever for moving the key-blank holder laterally during the feed movement of the holder, a cam for rocking said lever, a second rock lever for moving the cutting means transversely of the longitudinal axis of the blank, a second cam for rocking the second lever, means for revolving the cams in synchronism, and means for withdrawing one of the levers from and returning it to operative relation with its respective cam at a predetermined time in the operation of cutting each key.

32. In a key cutting machine, the combination of a blank holder, cutting means, mechanism for relatively moving the key-blank holder and cutting means lengthwise of the key blank in a feed movement and transversely to produce an irregular key face, including a pair of cams, means operating between one cam and the key-blank holder and between the other cam and the cutting means for moving the holder and cutting means transversely, and means for revolving one of the cams in single revolution movements during each of which to cut a single key and for revolving the other cam a different number of degrees during the cutting of said single key.

33. In a key cutting machine, the combination of cutting means, a key-blank holder, a shaft, means for driving the shaft in single revolution movements, a feed cam on said shaft, means operated by this cam for relatively moving the key-blank holder and cutting means in a feed movement, and cam means operated by said shaft for relatively moving the key-blank holder and cutting means transversely of the longitudinal axis of the key blank to produce an irregular key face.

34. In a key cutting machine, the combination of cutting means, a key-blank holder, a shaft, means for driving the shaft in single revolution movements, a feed cam on said shaft, means operated by this cam for relatively moving the key-blank holder and cutting means in a feed movement, a second cam on said shaft, and means operated by this cam for moving the key-blank holder transversely of the longitudinal axis of the key blank to produce an irregular key face.

35. In a key cutting machine, the combination of cutting means, a key-blank holder, a shaft, means for driving the shaft in single revolution movements, a feed cam on said shaft, means operated by this cam for relatively moving the key-blank holder and cutting means in a feed movement, a second cam on said shaft, means operated by this cam for moving the key-blank holder transversely of the longitudinal axis of the key blank to produce an irregular key face, a third cam operated in synchronism with the second mentioned cam, and means operating between the third cam and the cutting means for moving the latter transversely of the longitudinal axis of the key blank to jointly produce with the second cam an irregular key face.

36. In a key cutting machine, the combination of a pair of cutters arranged to operate on opposite sides of a key blank, a key-blank holder for moving a blank longitudinally between the cutters, means for moving the cutters in unison transversely of the longitudinal axis of the blank during the said feed movement to produce irregular key faces, and means for separating the cutters at the end of the cutting operation.

ROY D. KING.